United States Patent
Nakamura et al.

(10) Patent No.: US 7,320,135 B2
(45) Date of Patent: Jan. 15, 2008

(54) SYSTEM FOR SERVING INFORMATION IN RELATION TO VIDEO INFORMATION BROADCASTED ON ELECTRIC WAVE

(75) Inventors: Takeshi Nakamura, Tsurugashima (JP); Michikazu Hashimoto, Tsurugashima (JP); Hajime Miyasato, Tsurugashima (JP); Toshio Tabata, Tsurugashima (JP); Mitsuru Watanabe, Tsurugashima (JP); Yukitaka Saito, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 1124 days.

(21) Appl. No.: 10/028,236

(22) Filed: Dec. 21, 2001

(65) Prior Publication Data

US 2002/0080272 A1    Jun. 27, 2002

(30) Foreign Application Priority Data

Dec. 26, 2000  (JP)  ............................ P2000-395746
Dec. 26, 2000  (JP)  ............................ P2000-395747
Dec. 26, 2000  (JP)  ............................ P2000-395748

(51) Int. Cl.
*H04N 7/10*    (2006.01)
*H04N 7/025*   (2006.01)
*H04N 7/16*    (2006.01)

(52) U.S. Cl. .......................................... 725/36; 725/27
(58) Field of Classification Search ........ 725/112–113, 725/42–43, 60, 32–36, 110, 1–7, 23–28
See application file for complete search history.

(56) References Cited

U.S. PATENT DOCUMENTS

| | | | | |
|---|---|---|---|---|
| 5,708,845 A | | 1/1998 | Wistendahl et al. ........ 305/806 |
| 5,929,849 A | * | 7/1999 | Kikinis .................... 725/113 |
| 6,496,981 B1 | * | 12/2002 | Wistendahl et al. ........ 725/112 |
| 6,615,408 B1 | * | 9/2003 | Kaiser et al. .............. 725/112 |
| 6,637,028 B1 | * | 10/2003 | Voyticky et al. ............. 725/42 |
| 6,738,752 B2 | * | 5/2004 | Sako et al. ................. 705/400 |
| 6,944,228 B1 | * | 9/2005 | Dakss et al. ............ 375/240.24 |
| 2002/0104090 A1 | * | 8/2002 | Stettner ..................... 725/60 |
| 2003/0126597 A1 | * | 7/2003 | Darby et al. ................. 725/32 |

FOREIGN PATENT DOCUMENTS

| | | |
|---|---|---|
| DE | 44 37 928 C1 | 10/1995 |
| EP | 0 982 947 A2 | 8/1999 |
| GB | 2 312 591 | 10/1997 |
| WO | 00/45599 | 8/2000 |
| WO | 00/57295 | 9/2000 |
| WO | 00/77678 A1 | 12/2000 |

\* cited by examiner

*Primary Examiner*—Hunter B. Lonsberry
(74) *Attorney, Agent, or Firm*—Ladas & Parry LLP

(57) ABSTRACT

An information serving system includes a broadcasting station module (TV), user module (RV), and advertising agency module (AD). The broadcasting station module (TV) broadcasts pieces of broadcast information including at least video information. The user module (RV) receives the broadcast information, selects an image component composing an image from the received broadcast information, and produces specification information indicative of the selected image component. The user module (RV) transmits the produced specification information, while receiving component information to represent the received component information. The advertising company module (AD) acquires the specification information, and transmits to the user module (RV) the component information indicating an image component specified by the acquired specification information. This allows a viewer viewing a broadcasted program to acquire detailed information about a desired image component in an easier and quicker manner, thus enhancing usability of a broadcasting business.

15 Claims, 14 Drawing Sheets

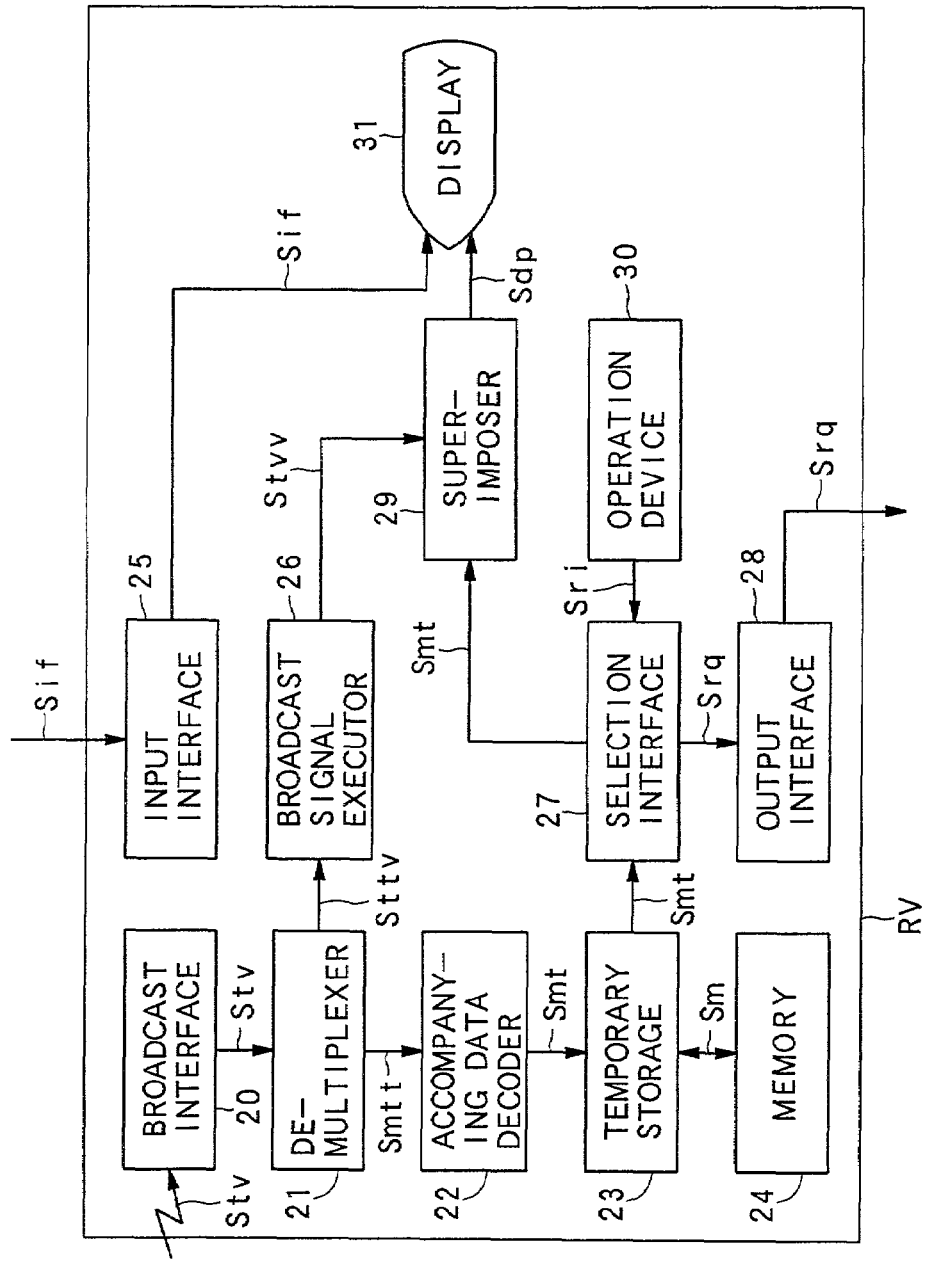

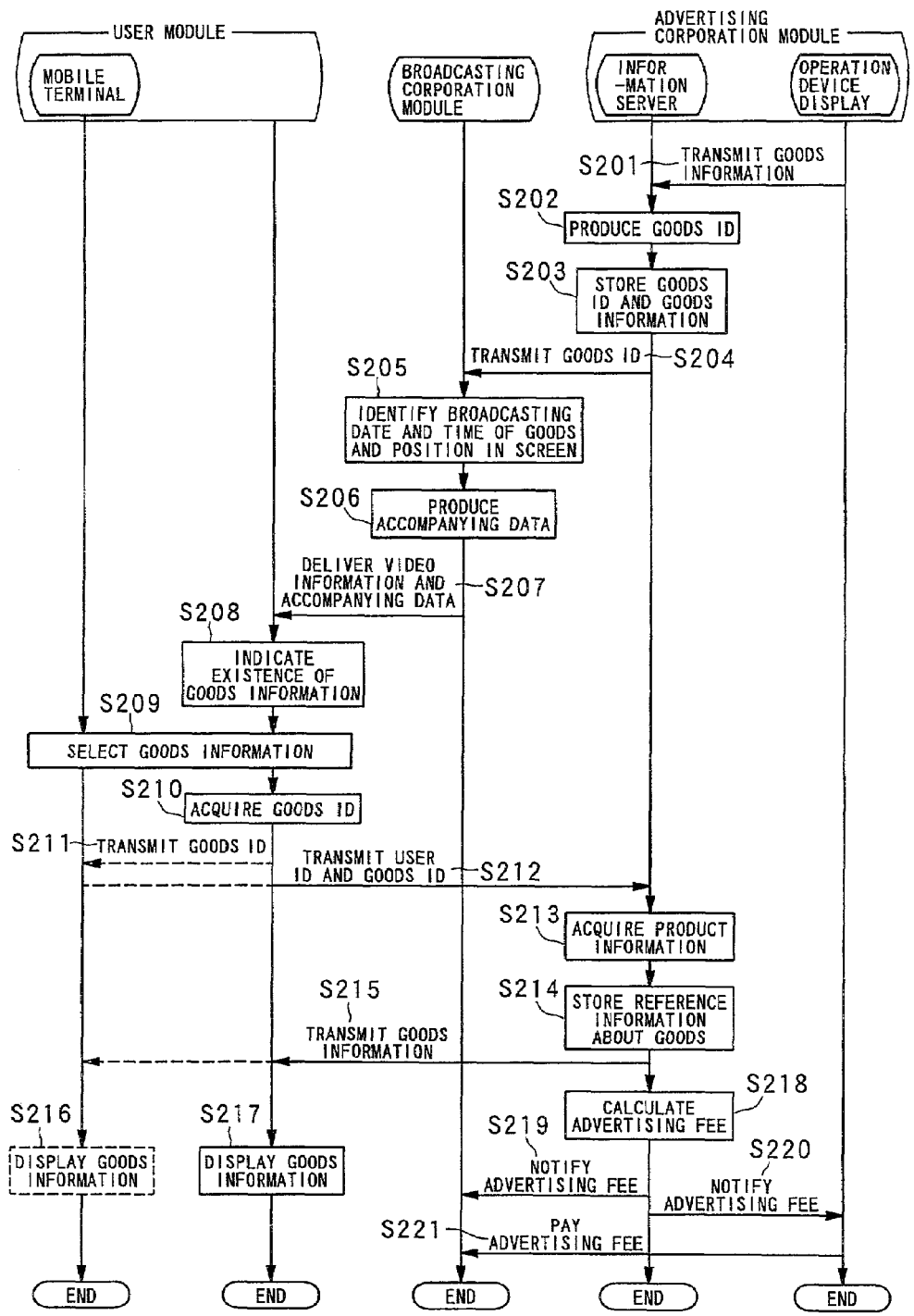

SYSTEM FOR SERVING INFORMATION IN RELATION TO VIDEO INFORMATION BROADCASTED ON ELECTRIC WAVE

BACKGROUND OF THE INVENTION

1. Field of the Invention

The present invention relates to a system for providing users with information in relation to video information, and in particular, to a system for providing users who receive a broadcast signal with information concerning video information included in the signal broadcasted.

2. Related Art

In general, videos to be broadcasted in television broadcasting include a variety of kinds of scenes. Such scenes frequently include appearance of actors and/or actresses who wear fashionable clothes, appearance of special foods, or famous hot-spring resorts.

Viewers who watch such videos (that is, users who receive the broadcast signal) often desire to obtain detailed information about particular goods included in the videos (for example, clothes or foods).

However, the viewer who desires to obtain such detailed information encounters difficulties resulting from the limitations of conventional program broadcasting systems. For example, such a viewer is required to make inquiries to a broadcasting station by providing the title of the program or other key information. Alternatively, such a viewer is required to write down necessary information about particular desired goods during watching the program and, later on, make inquires to a manufacturer, wholesaler, or others on the basis of the viewer's writing. In short, it is difficult for the viewer to obtain detailed information about particular goods in an easy and quick manner.

Additionally, this drawback results in that the usability of the broadcasting business has been reduced.

On the other hand, conventional program broadcasting systems have long adopted the use of advertisements, in which the broadcasting station receives payment of advertisement fees from their clients (manufactures or others) for broadcasting commercials of their clients.

The above program broadcasting systems, however, has a drawback in that a viewer cannot obtain information about viewer's desired goods appearing in broadcasted programs. The result is, from one point of view, that manufactures or others fail to obtain many opportunities to advertise or popularize their products or goods. From another point of view, in the conventional broadcasting systems, broadcasting enterprises lose opportunities to be paid for providing the aforementioned detailed information about viewer's desired goods appearing in broadcasted programs.

SUMMARY OF THE INVENTION

A first object of the present invention is to provide, with due consideration to the drawbacks of such a conventional system, an information serving system which permits a viewer who watches a broadcasted program to obtain detailed information about a viewer's desired goods or others with ease and without undue delay.

A second object of the present invention is to provide an information serving system that permits a viewer who watches a broadcasted program to obtain detailed information about a viewer's desired goods or others with ease and without undue delay, resulting in that chances to advertise or popularize goods or others of which information is desired to be given to viewers can be increased and chances to be paid, as an information serving fee, for servicing such information can also be increased.

The above objects are also directed to an information serving module included in the information serving system, an information serving method carried out by the information serving module, a broadcast module included in the information serving system, a broadcast method carried out by the broadcast module, a reception module included in the information serving system, a reception method carried out by the reception module.

In order to attain the first object, as one embodiment, an information serving system according to the present invention comprises: a broadcast module, a reception module, and an information serving module. The broadcast module has a broadcast unit to broadcast a program including at least video information. The reception module has a receiver to receive the broadcasted program, a selector to select an image component composing an image consisting of the video information included in and integrated with the received program, a producing unit to produce specification information indicative of the selected image component, a transmitter to transmit the produced specification information, and a presenting unit to receive incoming component information and present the received component information. The information serving module has an acquiring unit to acquire the incoming specification information, and a transmitter to transmit to the reception module the component information indicative of the image component indicated by the acquired specification information.

Still, in order to attain the first object, an information serving system according to the present invention preferably provides a first configuration comprising: a broadcast module, such as a broadcasting station module, having broadcast means, realized by for example a CPU, for broadcasting a program including at least video information; a reception module, such as a user module, having: reception means, realized by for example a broadcasting interface, for receiving the broadcasted program, selection means, by way of example, realized by an operation device, for selecting an image component composing an image consisting of the video information included in the received broadcast information, production means, such as a selection interface, for producing specification information indicative of the selected image component, transmission means, such as an output interface, for transmitting the produced specification information, and presentation means, such as a display, for receiving incoming component information and presenting the received component information; and an information serving module, realized for example by an advertising company module, having acquisition means, such as an input interface, for acquiring the incoming specification information, and transmission means, such as an output interface, for transmitting to the reception module the component information indicative of the image component indicated by the acquired specification information.

Accordingly, component information concerning an image component selected at the reception module is transmitted from the information serving module to the reception module so that the component information is present on the reception module. Thus, in an easy and quick manner, a user who handles the reception module is able to acquire component information concerning the image component selected at the reception module. Accordingly, usability of the broadcasting bussiness can be enhanced.

Preferably, as a second configuration, there is provided an information serving system, wherein the broadcast means included in the broadcast module is configured to include identification information to identify the image component into the broadcast program and broadcast the program with the identification information therein, and the production means included in the reception module is configured to produce, as the specification information, the identification information broadcasted correspondingly to the selected image component. Accordingly, identification information is broadcasted with its inclusion in broadcasted program. The identification information that broadcasted correspondingly to an image component selected at the reception module serves as specification information. It is therefore possible that the correspondence between the image component and the specification information can be sustained firmly and transmitted to the information serving module.

Still preferably, as a third configuration, there is provided an information serving module, wherein, in the second configuration, the information serving module further includes transmission means for transmitting the identification information to the broadcast module, and the broadcast means included in the broadcast module is configured to include the incoming identification information into the broadcast information and to transmit the broadcast information with the identification information included therein. Accordingly, because identification information, which is included in broadcast information, is transmitted from the information serving module, the correspondence between the identification information and the component information can be kept accurately and the component information can be provided without fail.

Still, a broadcast module included in the information serving system according to the first to third configurations is provided to have the broadcast means. Hence, video information is transmitted together with identification information about each image component, which allows the reception module to acquire component information in relation to a desired image component.

A reception module included in the information serving system according to the first to third configurations is provided. The reception module comprises the reception means; the selection means; the production means; the transmission means; and the presentation means. As a result, component information about an image component selected on an image based on broadcasted information. A user who handles the reception module is able to acquire the component information corresponding to the image component in an easy and quick manner. A reception method carried out by the reception module is provided as well.

A reception module included in the information serving system according to either one of the second or third configuration is provided. The reception module comprises the reception means; the selection means; the production means; the transmission means; and the presentation means, wherein the identification information includes component identifying information for identifying the image component, highlight information for highlight-displaying the image component in displaying the image component by the selection means included in the reception module, date and time information indicative of a date and time on and at which the broadcast information including the image component is broadcasted, and positional information indicative of a display position of the image component in the image composed of the image component, and the selection means includes highlight display means for highlight-displaying the image component determined by the identification information, the date and time information, and the positional information. Therefore, an image component is highlighted in display based on component identification information, highlight information, date and time information, and positional information. A user is capable of easily recognizing an image component having the component information, and obtaining desired component information with easiness and quickness.

An information serving module included in the information serving system of any of the first to third configurations is provided. The information serving module comprises the acquisition means and the transmission means. Accordingly, since component information about an image component selected at the reception module is returned to the reception module, it is possible for a user to acquire the component information easily and quickly. An information serving method carried out by the information serving module is also provided.

Further, there is provided a broadcast method carried out by the broadcast module included in the information serving system of either of the second or third configuration. The method comprises the step of broadcasting the program in which the identification information to identify the image component is included. Thus, broadcast information including the program and identification information is broadcasted, so that the correspondence between the identification information and the component information is maintained firmly, thus information being serviced without fail.

Alternatively, in the information serving system of the first configuration, the production means of the reception module may be configured to produce, as the specification information, a piece of specification information including at least information about time at which positional information indicative of a position of the image component in the image and the image including the image component are outputted. This enables a user to acquire information concerning a desired image component easily and quickly.

In order to attain the second object, in the information serving system according to the first configuration of the present invention, the broadcast module further comprises fee processing means for acquiring and processing a piece of incoming information about a fee payment for information serving, and the information serving module further comprises fee information transmitting means for producing the fee payment information about payment of an information serving fee accompanying the transmitted component information when the transmission means transmits the component information to the reception module and for transmitting the produced fee payment information to the broadcast module.

Therefore, component information about an image component selected at the reception module is transmitted from the information servicing module to the reception module for representation of the component information. It is therefore for a user to acquire the component information easily and quickly. The chances of advertising and popularizing image components to which component information is given can be enhanced. And an information servicing business involved with the information service fee can be developed more.

In the above information serving system, byway of example, the broadcast module may further comprise fee information acquiring means, such as an advertising fee processor, for acquiring a piece of incoming information about a fee for information serving transmitted from the information serving module, and the information serving module may further comprise further fee information transmitting means, such as an advertising fee calculator, for transmitting to the broadcast module the fee information indicative of the information serving fee prior to transmitting the fee payment information, when the component information is transmitted to the reception module. Hence, information about a fee for servicing information is transmitted to the broadcasting module prior to the transmission of payment information about the fee. It is therefore possible that a broadcasting station is able to know the fee that should be paid, before the actual payment.

The other features or inherent configurations of the present invention will be described both in the accompanying drawings and in the preferred embodiments described with the accompanying drawings.

BRIEF DESCRIPTION OF THE DRAWINGS

In the accompanying drawings:

FIG. 4 is a block diagram showing a detailed structure of a receiving side module in the first embodiment;

FIG. 5 is a flowchart showing an information serving action in the first embodiment;

PREFERRED EMBODIMENTS OF THE INVENTION

Preferred embodiments of the present invention will be described in conjunction with the appended drawings.

In the following embodiments, the present invention is applied to an information serving system for serving detailed information about a target to be traded or popularized (or advertised). The target to be marketed or popularized is specified with utilization of a broadcasted signal. Thus the detailed information about the specified target is provided to a user who makes use of the broadcasted signal. The target to be marketed and popularized, which is once provided to a user as an "image component" through the broadcasted signal, includes a variety of types. Specifically, the target includes both of a variety of "goods" to be traded or popularized and a variety of "services (actions)" to be marketed or popularized, provided the services can be specified. The "goods" include clothes, shoes, home appliances, books, and cars, even buildings, meanwhile the "services" include tours (tour programs), amusements, reservation of hotels, parties, and meetings.

The following embodiments will be described by employing "goods" as the target to be traded or popularized.

First Embodiment

A first embodiment of the present invention will be described in conjunction with FIGS. 1 to 7.

Figure 1:
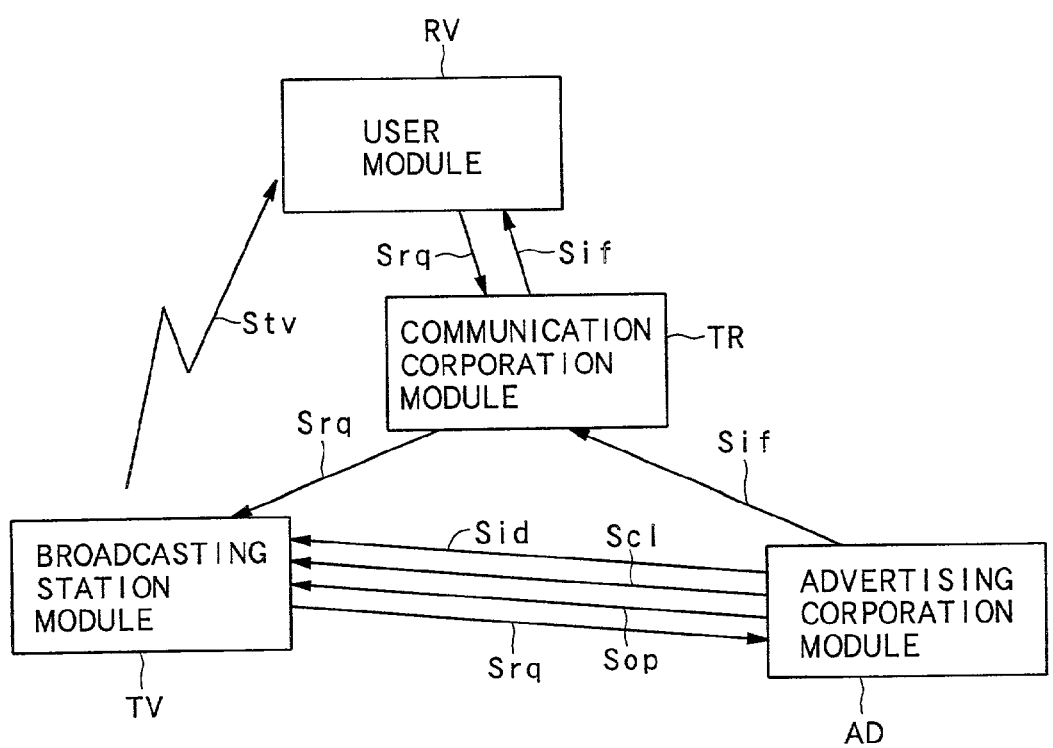
FIG. 1 is a block diagram outlining the structure of an information serving system according to a first embodiment of the present invention.
Figure 2:
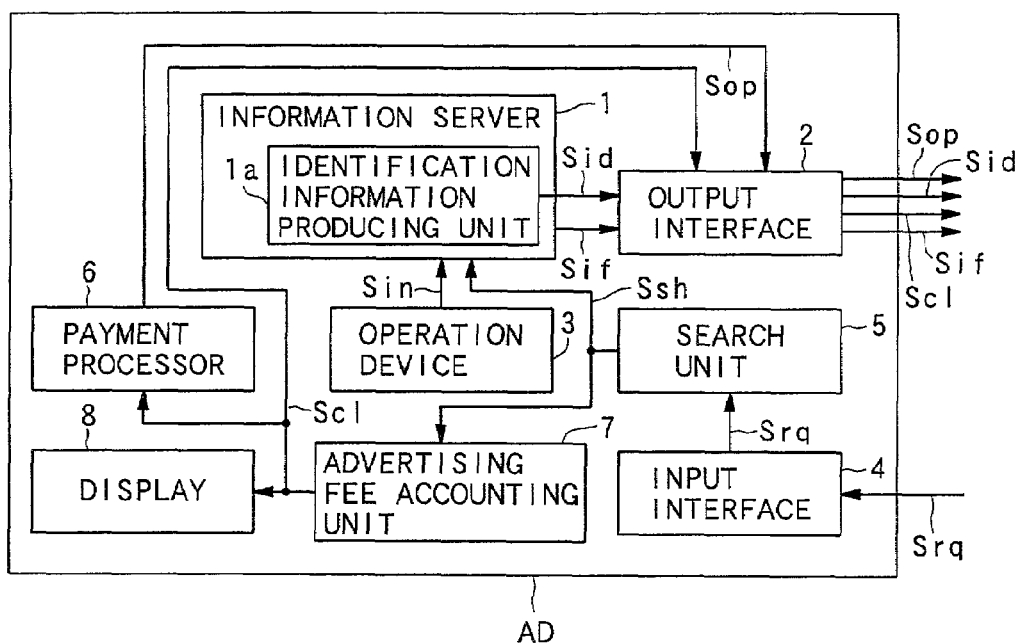
FIG. 2 is a block diagram showing a detailed structure of an advertising company module in detail in the first embodiment.
Figure 3:
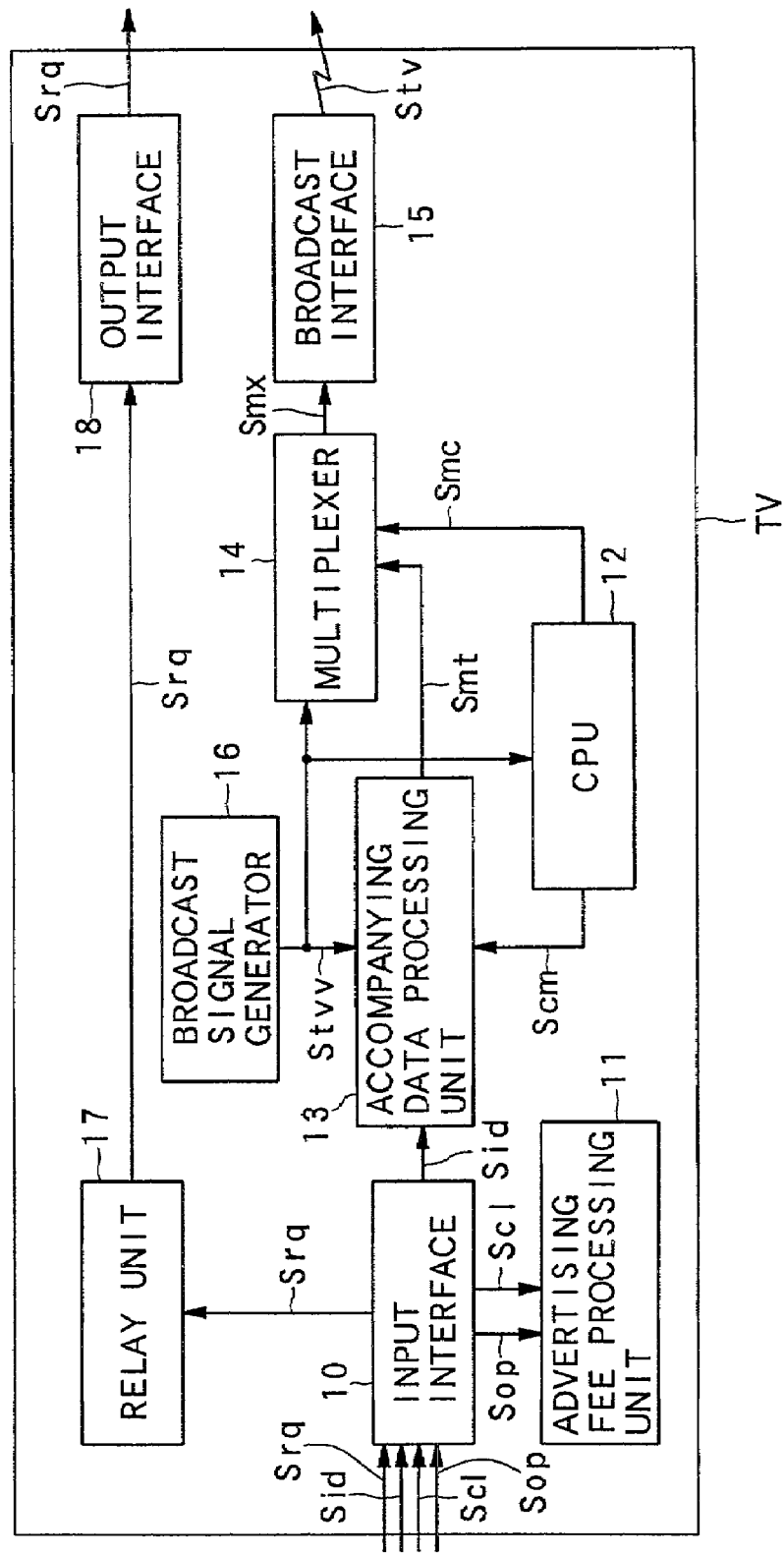
FIG. 3 is a block diagram showing a detailed structure of a broadcasting station module in the first embodiment.
Figure 6A:
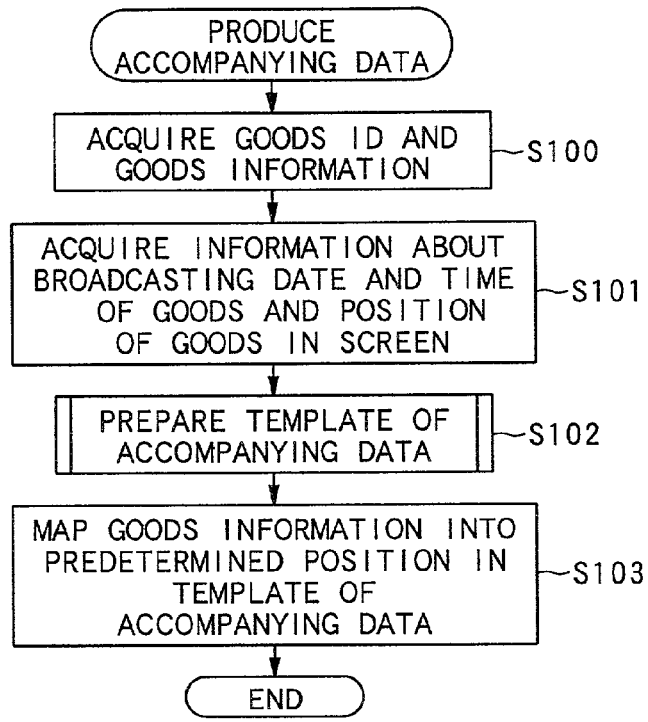
FIG. 6A is a flowchart which shows preparing processing of a supplementary data used in the information serving action in the first embodiment.
Figure 6B:
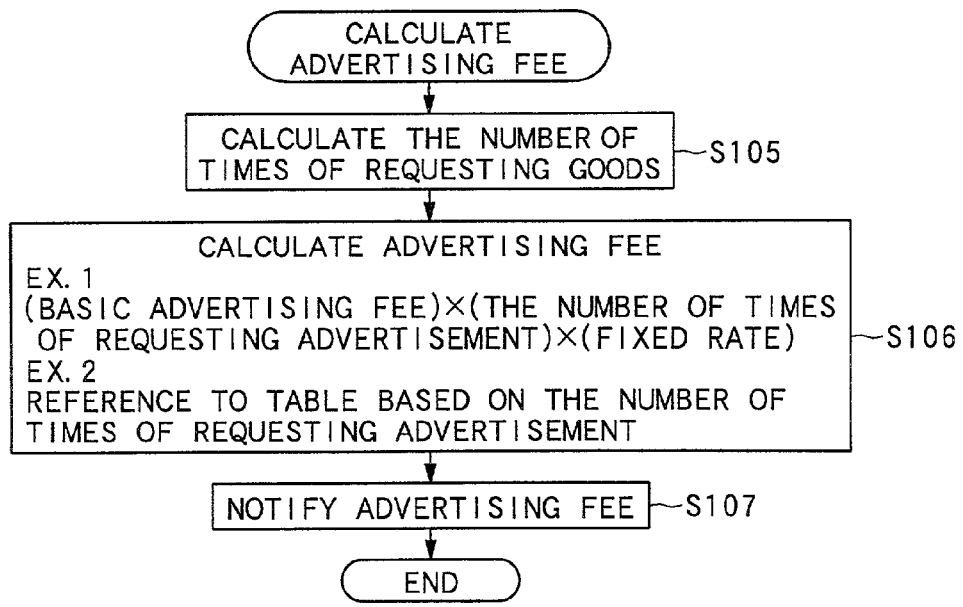
FIG. 6B is a flowchart showing a calculation processing of a charge for advertisement in the information serving action in the first embodiment.
Figure 7:
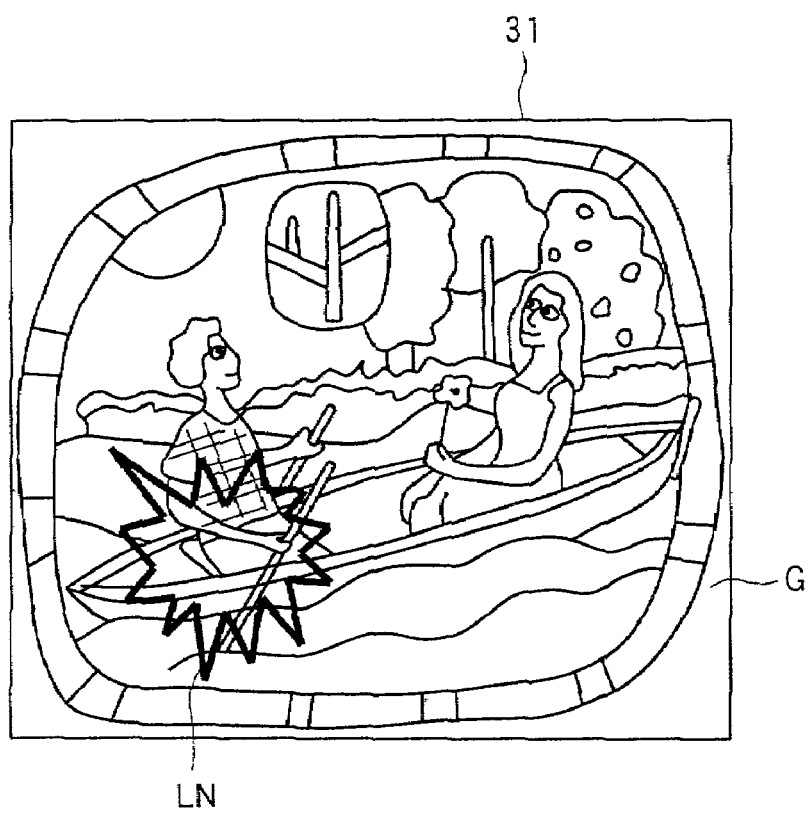
FIG. 7 is a diagram for an illustration of an image display in the first embodiment.

FIG. 1 is a block diagram outlining the whole configuration of an information serving system according to the first embodiment of the present invention. FIGS. 2 to 4 are diagrams showing detailed configurations of each module that comprises the information serving system. FIGS. 5, 6A and 6B are diagrams showing information serving processes carried out in the information serving system. Further FIG. 7 shows a diagram exemplifying an image displayed in the first embodiment.

The whole configuration and operation of the information serving system in the first embodiment will now be described using FIG. 1.

As shown in FIG. 1, an information serving system S is composed of an advertising company module AD serving as an information serving module arranged at an advertising company, a broadcasting station module TV serving as a broadcasting module arranged at a broadcasting station, a communication company module TR arranged at a communication company, and a user module RV serving as a receiver module placed at a user's house that receives broadcasted signal.

The foregoing information serving system S provides detailed information about goods to those who use the user module RV from the advertising company module AD placed at an advertising company who are dealing with the goods. In this information serving system S, goods are included as an image component corresponding to part of an image provided by a TV program (hereinafter, simply referred to as "program"). The program is represented by the user module RV that receives a broadcast signal transmitted from the broadcasting station module TV, so a user is able to view images represented on the module TV.

First, in the case that some new product is advertised, which is newly employed in a certain program, the advertising company module AD generates an identifying signal $S_{id}$. This signal $S_{id}$ includes both of goods identifying information to identify the new goods and outline information that outlines the new goods. The advertising company module AD transmits the identifying signal $S_{id}$ to the broadcasting station module TV.

Based on the identifying signal $S_{id}$, the broadcasting station module TV has accompanying data included into a broadcast signal $S_{tv}$, then transmits the signal $S_{tv}$ to the user module RV in the form of broadcast signals. The broadcast signal $S_{tv}$ is produced correspondingly to a program, in which the goods shown by the identifying signal $S_{id}$ is included. The accompanying data include specification information to specify an image in which the goods are included (i.e. the goods are displayed as part of the image) and highlight information to highlight the position of the goods in the image and the goods itself.

Receiving the broadcast signal $S_{tv}$ including the accompanying data, the user module RV enables images and sound to be displayed and outputted correspondingly to the broadcast signal $S_{tv}$. Thus, a user is able to view the program at the user module RV.

When the goods corresponding to the above mentioned accompanying data appear in an image, a highlight depiction is performed on the picture based on the highlight information, so that the user recognizes that detailed information about the highlight-displayed goods is available for the user through another procedure.

If the user selects the goods highlight-displayed by selecting means described later, an information request signal $S_{rq}$ is transmitted from the user module RV to the communication corporation module TR. The information request signal $S_{rq}$ includes goods identifying information, which is included in the accompanying data corresponding to the selected goods. The signal $S_{rq}$ is outputted through a wired telephone line or a cellular phone line.

In response, the communication company module TR transmits the information request signal $S_{rq}$, with no change added to this signal, to the broadcasting station module TV via the wired telephone line or the cellular phone connection. Then the broadcasting station module TV relays the information request signal $S_{rq}$ to the advertising corporation module AD.

The advertising company module AD produces a detailed information signal $S_{if}$ that includes detailed information about the goods indicated by the goods identifying information contained in the information request signal $S_{rq}$, and sends the produced signal $S_{if}$ to the communication company module TR. The signal $S_{if}$ is then transmitted through the wired telephone line or the cellular phone line.

In reply to this transmission, the communication company module TR transmits the detailed information signal $S_{if}$, with no change added to this signal, to the user module RV through the wire telephone line or the cellular phone line.

The user module RV represents on a later-described display the detailed information contained in the detailed information signal $S_{if}$. This enables the user to obtain detailed information about desired goods that appeared in the program.

Referring to FIGS. 2 to 6A and 6B, each module included in the information serving system S according to the first embodiment will now be explained in detail in terms of its operation.

First, each module will be explained in detail concerning its configuration with reference to FIGS. 2 to 4.

As shown in FIG. 2, the communication company module AD has an information server 1 which includes an identification information producing unit 1a, output interface 2 serving as transmission means, operation device 3, input interface 4 serving as reception means, search unit 5, payment processor 6 serving as transmission means for fee information, advertising fee calculator 7 serving as transmission means of fee information, and display 8.

As shown in FIG. 3, the broadcasting station module TV consists of an input interface 10, advertising fee processing unit 11 serving as fee information receiving means, CPU 12, accompanying data producing unit 13, multiplexer 14, broadcast interface 15, broadcast signal generator 16, relay unit 17, and output interface 18. The CPU 12 controls each constituent by using later-described control signals $S_{cm}$ and $S_{mc}$. The CPU 12 works as broadcasting means as well as fee information acquiring means.

Furthermore, as shown in FIG. 4, the user module 4 consists of a broadcast interface 10 serving as reception means, demultiplexer 21, decoder of accompanying data 22, temporary storage 23, memory 24, input interface 25, decoder of broadcast signal 26, selection interface 27 serving as production means, output interface serving as transmission means, superimposer 29, operation device 30 which works as selection means and specification means, and display 31 serving as representation means and highlight-display means.

The communication corporation module TR will not be discussed in detail, because it is composed of a conventional and ordinary wired or wireless switch board and only relays the information request signal $S_{rq}$ and the detailed information signal $S_{if}$.

Further, referring mainly to FIGS. 5, 6A and 6B, each module will now be explained in detail about its operation.

In FIG. 5, for the sake of simplified explanation, processing carried out by both of the operation device 3 and the display 8 and further processing carried out by the information server 1, three of which are contained in the advertising company module AD, are explained separately. Communication between the user module RV and the communication company module TR is made through a wireless telephone line or cellular telephone connection, both of which will now be explained together.

In information serving processing carried out in the first embodiment, the first operation relates to the determination of goods and their detailed information. That is, in the advertising company module AD, in response to the determination of both of goods displayed on an image in a certain program and required to service their detailed information and the detailed information, the detailed information is outputted from the operation device 3 to the information server 1 as an input signal $S_{in}$ for each piece of goods and stored in the information server 1 (step S201).

When the detailed information being received by the information server 1, the identification information producing unit 1a produces a piece of goods identifying information (in FIG. 5, "goods ID" is designated as the goods identifying information) to identify the newly stored detailed information (step S202). Then the unit 1a stores in the information server 1 the goods identifying information with correspondence to the original goods (step S203). In parallel, the unit 1a produces the foregoing identification signal $S_{id}$, then sends it to the output interface 2. The signal $S_{id}$ includes the produced goods identifying information and outline information indicative of the name of goods, its manufacture, and others.

The output interface 2 performs an output interface process on the identification signal $S_{id}$, and outputs it to the broadcasting station module TV (step S204).

The identification signal $S_{id}$, which is outputted from the advertising corporation module AD and inputted into the broadcasting station module TV shown in FIG. 3, is sent to the input interface 10. The signal $S_{id}$ is subjected to predetermined input interface processing in an input interface 10, then outputted to the accompanying data producing unit 13.

On the other hand, the broadcast signal generator 16 produces a broadcast source signal $S_{tvv}$. This broadcast source signal $S_{tvv}$ contains information required for broadcasting a program, which is data other than the above accompanying data. Then the signal $S_{tvv}$ is sent to the accompanying data producing unit 13, the multiplexer 14, and the CPU 12.

The accompanying data producing unit 13 produces the accompanying data $S_{mt}$ on the basis of not only the control signal $S_{cm}$ generated by the CPU by making reference to the broadcast source signal $S_{tvv}$ but also the identification signal $S_{id}$ and the broadcast source signal $S_{tvv}$ (steps S205 and S206). The accompanying data $S_{mt}$ includes specification information to specify an image of the program in which the goods are contained, a display position of the goods in the image, highlight information to highlight in display the goods present in the image, and the goods identifying information. The accompanying data $S_{mt}$ are sent to the multiplexer 14.

More concretely, the accompanying data $S_{mt}$ includes, as the foregoing specification information, the image frame number of an image to be targeted in the program. Further, the display position is, by way of example, designated by information indicative of a period of time measured from the start of the horizontal scanning in the image frame determined by the frame number. The highlight information is for example designated by data of a frame surrounding the goods on an image, information necessary to highlighting the surrounding frame (e.g., by blinking it), or a train of characters to be displayed for showing the outlines of the goods (such as the good's name and manufacture). Incidentally, the good's identifying information will not be displayed within the image of the goods.

A producing operation of the accompanying data $S_{mt}$, which is carried out by the accompanying data producing unit 13, will now be explained with reference to FIG. 6A. At first, both of the goods identifying information and the outline information, which are both contained in the identification signal Sid, are obtained (step S100). Then, the broadcast date and time of a program involving display of goods, the identification information, and the display position are acquired based on the broadcast source signal $S_{tvv}$ and the identification signal Sid (step S101).

In parallel to this, a template (a prototypal pattern) indicating the format of the accompanying data $S_{mt}$ is prepared (step S102). The obtained pieces of information, i.e. the goods identifying information, specification information, outline information, highlight information, broadcast date and time of the program, and display position, are put into each corresponding position of the template (step S103). Thus, one set of the accompanying data $S_{mt}$ is produced for one piece of the goods identifying information.

The accompanying data $S_{mt}$ thus produced is subject to a superimposing process in the multiplexer 14. That is, the data $S_{mt}$ are superimposed in a time-sharing manner onto the broadcast source signal $S_{tvv}$ under the control of the control signal $S_{mc}$ supplied from the CPU 12. Thus the processed data are outputted as superimposed data $S_{mx}$, and inputted into the broadcast interface 15. After experiencing predetermined output interface processing in the broadcast interface 15, the data is transmitted as a broadcast signal $S_{tv}$ to the user module RV (step S207).

As for the frequency of transmission of the accompanying data $S_{mt}$ (the transmission is performed through the output interface 15 after the superimposition in the multiplexer 14), the accompanying data $S_{mt}$ are unnecessary to be broadcasted constantly as the broadcast signal $S_{tv}$, because the quantity of the data $S_{mt}$ are small. For example, all combined accompanying data $S_{mt}$ that should be broadcasted on the day may be broadcasted immediately after the broadcast is started on the day. Alternatively, only the accompanying data $S_{mt}$ may be broadcasted exclusively in the time zone, such as midnight, where the other programs are not on the air. This also makes it possible to transmit the data $S_{mt}$ to the user module RV.

In cases where the above broadcast is made with the images and others compressed using, for example, MPEG 2 (Moving Picture Experts Group 2) technique, the accompanying data $S_{mt}$ can be broadcasted as an elementary stream of the transport streams based on the MPEG 2. The elementary stream of the accompanying data $S_{mt}$ can be broadcasted together with other elementary streams in a time sharing manner. The other elementary streams are composed of, for example, elementary streams each including image information, audio information, and character information.

The elementary stream composed of the accompanying data $S_{mt}$ is structured as follows. By way of example, a piece of section information (i.e., tag information) indicating the section in each piece of information is added to each piece of information composing the accompanying data $S_{mt}$ at immediately before and after each piece of the information in the time sequence. The information composing the accompanying data $S_{mt}$ includes the goods identifying information, goods specifying information, outlined information, highlighted information, and information in relation to the broadcast date and time of a program and the display position of an image of goods.

In the user module RV, the received broadcast signal $S_{tv}$ on which the accompanying data $S_{mt}$ are superimposed is inputted to the broadcast interface 20, as shown in FIG. 4. In the interface 20, the signal $S_{tv}$ is subjected to predetermined input interface processing, then sent to the demultiplexer 21.

The demultiplexer 21 divides the broadcast signal $S_{tv}$ into a broadcast souse signal $S_{tvv}$ that has experienced the input interface processing and the accompanying data $S_{mtt}$ that has experienced the input interface processing. The broadcast source signal $S_{tvv}$ is sent to the broadcast signal decoder 26, while the accompanying data $S_{mtt}$ are sent to the accompanying data decoder 22.

The accompanying data decoder 22 decodes the accompanying data $S_{mtt}$ to produce the original accompanying data $S_{mt}$, which is then sent to the temporary storage 23 to be stored temporarily.

Of the accompanying data $S_{mt}$, necessary data are sent to the memory 24 via the temporary storage 23, and stored therein as a memory signal $S_m$.

Meanwhile, the broadcast source signal $S_{tvv}$ outputted to the broadcast signal decoder 26 is decoded by the decoder into the original broadcast signal $S_{tvv}$, which is then sent to the superimposer 29.

Concurrently with this, the accompanying data $S_{mt}$ stored in the temporary storage 23 or the memory 24 is read directly from the temporary storage 23 or read from the memory 24 as the memory signal $S_m$. The read-out signal is then outputted to the superimposer 29 by way of the selection interface 27.

Accordingly, the superimposer 29 superimposes the broadcast source signal $S_{ttv}$ and the accompanying data $S_{mt}$ one on another. The superimposed signal is sent to the display 31 as a display signal $S_{dp}$ that should be visualized on the display 31.

The display 31 uses the received broadcast source signal $S_{tvv}$, on which the accompanying data $S_{mt}$ are superimposed, to display a dynamic image or static image of a certain program (step S208).

Practically, this display is exemplified in FIG. 7. Suppose that detailed information about goods included in an image G (dynamic or static image) displayed on the display 31 (in FIG. 7, a T-shirt worn by a person at the left) is available in response to a user's request. In such a case, based on the highlighted information included in the accompanying data $S_{mt}$ for the image G, a frame LN is placed on the image so that it surrounds the T-shirt. This display of the frame LN enables the user who watches the image G to recognize that the detailed information about the T-shirt is available.

If the user is interested in the goods highlighted by the frame LN on the display 31, the user can take action to select the desired goods at the operation device 30 at timing when the desired goods are highlight-displayed (step S209).

This selection is detailed as follows. One example is such that the position of a cursor displayed on the display 31, which is movable by the user, is always monitored by the selection interface 27. When goods are selected on the image (for example, the selection can be made with a click of a mouse in charge of movement of the cursor), the selection is reflected in an operation signal $S_{ri}$ outputted by the operation device 30. Thus, based on the operation signal $S_{ri}$, the selection interface 27 is able to recognize such selection and goods pointed by the cursor position. Alternatively, a laser pointer can make a pointing technique for such selection. Still, other exiting pointing techniques, such as use of frames, may also be used. In the case of using the laser pointer, as the lighting source, a mobile terminal that has the capability of lighting the laser pointer may be adopted (refer to the user module in FIG. 5). Still, a device for detecting an arriving point of a view line from a user can be employed, which enables the detection of goods targeted by the user, thus providing selection of goods.

In response to the recognition of desired goods being selected, the selection interface 27 acquires goods identifying information indicative of the selected goods from the accompanying data $S_{mt}$ (step S210). The interface 27 then adds, to the acquired goods, identifying information, individual identifying information to identify a user who has the user module RV so that the foregoing information request signal $S_{rq}$ is produced. To be specific, the individual identifying information is for example the telephone number of a user's house and referred as "user ID" in FIG. 5. The information request signal $S_{rq}$ thus produced is then sent to the output interface 28.

The output interface 28 performs predetermined output interface processing on the information request signal $S_{rg}$, before transmitting the processed signal to the communication company module TR via the wired telephone line (step S212).

The transmission of the information request signal $S_{rg}$ can be modified into another way. Practically, the goods identifying information obtained by the selection interface 27 is transmitted, as in FIG. 5, to a mobile terminal on the basis of a short-distance wireless communication technique, such as Bluetooth (step S211). And the goods identifying information is transmitted from the mobile terminal to the communication company module TR based on the wireless technique.

The communication company module TR receives the incoming information request signal $S_{rq}$, and sends it to the broadcasting station module TV through the wired or wireless telephone connection (step 212). In transmitting the information request signal $S_{rq}$ from the user module RV to the broadcasting station module TV, information, such as the telephone number or Internet address of the broadcasting station module TV, is transmitted from the broadcasting station module TV to the user module RV at predetermined intervals.

Responsively to the transmission, in the broadcasting station module TV, as shown in FIG. 3, the input interface 10 receives the information request signal $S_{rq}$, and sends it the relay unit 17. The relay unit 17 performs predetermined processing on the signal $S_{rq}$ to provide the resultant signal to the output interface 18. Therefore, the output interface 18 gives predetermined processing to the information request signal $S_{rq}$, then sends the resultant signal to the advertising company module AD via, for example, the wired telephone line (step S212).

In the advertising company module AD, as shown in FIG. 2, the input interface 4 operates to give predetermined processing to the information request signal $S_{rq}$, and sends the resultant signal to the search unit 5.

The search unit 5 extracts the goods identifying information included in the information request signal $S_{rq}$, and supplies the extracted goods identifying information to both the information server 1, as a search signal $S_{sh}$ to search the information server 1, and the advertising fee calculator 7.

The information server 1 performs the search to acquire detailed information of goods specified by the search signal $S_{sh}$ (step S213). And the information server 1 acquires goods reference information about the goods, which should be referred to the detailed information, and temporarily stores the acquired goods reference information (step S214). The information server 1 produces a detailed information signal $S_{if}$ that includes the detailed information, and sends the produced signal to the output interface 2.

In reply to this sending, the output interface 2 gives predetermined output interface processing to the detailed information signal $S_{if}$, and sends the processed signal to the communication company module TR via the wired or wireless telephone line (step S215).

The communication company module TR accepts the incoming detailed information signal $S_{if}$, transmitting it to the user module RV through the wired and wireless telephone line (step S215).

As shown in FIG. 4, the input interface 25 of the user module RV that has received the detailed information signal $S_{if}$ has it displayed on the display 31 (step S217) Therefore, the user who watches this display 31 is able to acquire both the detailed information in relation to the goods previously selected on the program and reference signal relating to the goods.

One additional modification can be established as follows. The detailed information signal $S_{if}$ that has come to the user module RV may be transferred to the mobile terminal based on the foregoing short-distance wireless communication technique, so that such information may be displayed on the terminal (step S216).

On the other hand, in the advertising company module AD, based on the search signal $S_{sh}$ and the detailed information about the goods stored in the information server 1, the advertising fee calculator 7 calculates an advertising fee corresponding to the detailed information supplied, as the detailed information signal $S_{if}$, to the user who handles the user module RV. And the calculator 7 provides the display 8 with the fee in the form of a calculation signal $S_{cl}$ so that the amount of the fee is displayed and notified (step S220). The calculation signal $S_{cl}$ is also provided to both of the output interface 2 and the payment processor 6.

The output interface 2 performs predetermined output interface processing on the calculation signal $S_{cl}$, then sends it to the broadcasting station module TV via the wired telephone line, for example (step S219).

Practically, the advertising fee is calculated as shown in FIG. 6B. In other words, first, based on the search signal $S_{sh}$ and the detailed information about the goods stored in the information server 1, the number of times at each of which the service of the detailed information (i.e., the service of an advertisement) is requested is found (step S105). The advertising fee is actually calculated using the number of request times (step S106).

As exemplified in FIG. 6B, one calculation formula is that a fee obtained by multiplying the number of request times by a constant rate is added to a predetermined basic advertising fee set to a certain amount (refer to "example 1" in FIG. 6B). An alternative calculation formula is that the advertising fees are pervasively listed in a table at every number of request times, the table being stored in a memory (not shown) of the advertising fee calculator 7, and the number of request times is referred to the table to obtain an advertising fee (refer to "example 2" in FIG. 6B).

When receiving the calculation signal $S_{cl}$, the input interface 10 of the broadcasting station module TV executes predetermined input interface processing for the calculation signal $S_{cl}$, before giving it to the advertising fee processor 11. The advertising fee processor 11 is therefore able to find an amount of the advertising fee that should be paid by the advertising company, a payer of the fee, and others.

In the advertising company module AD, the payment processor 6 carries out processing for paying the advertising fee shown by the calculation signal $S_{cl}$ to a broadcasting station managing the broadcasting station module TV. By this processing, a processing result signal $S_{op}$ showing a processed result is produced and sent to the output interface 2.

The output interface 2 performs predetermined output interface processing on the processing result signal $S_{op}$, and outputs it to the broadcasting station module TV via the wired telephone line, for example (step S221).

In the broadcasting station module TV, the input interface 10 gives predetermined input interface processing to the received processing result signal $S_{op}$, then sends it to the advertising fee processor 11. This processor 11 is able to find that the advertising company has paid the advertising fee.

As described above, the information serving system S of the first embodiment has the capability of transmitting the detailed information about goods selected at the user module RV, which receives the broadcast signal $S_{tv}$, from the advertising company module AD to the user module RV and provides the detailed information at the user module RV. A user who handles the user module RV is able to acquire, with easiness and quickness, information in relation to goods to be viewed.

Accordingly, usability of the broadcasting business is greatly enhanced for the user.

The various other advantages can be gained as well. For example, the identification information is included in the broadcast signal $S_{tv}$ to be broadcasted from the broadcasting station module TV, while goods identifying information broadcasted correspondingly to goods selected at the user module RV is used. Accordingly, this permits the correspondence relationship between selected goods and goods identifying information to be maintained accurately, which are then transmitted to the advertising company module AD.

The goods identifying information to be broadcasted with the broadcast signal $S_{tv}$ is transmitted from the advertising company module AD having detailed information. Therefore, the correspondence relationship between goods identifying information and detailed information can be kept firmly and pieces of detailed information are provided to a user without fail.

The broadcasting station module TV broadcasts video information together with goods identifying information corresponding to each piece of goods. This makes the user module RV give a user detail information about desired goods with accuracy.

The user module RV is able to present detail information concerning goods selected in an image of the broadcast signal. Hence, a user is able to obtain, easily and quickly, detailed information about goods viewed on the image.

Further, in the user module RV, goods are highlight-displayed based on identification information, highlight information, date and time information, and positional information included in the received broadcast signal. A user who handles the user module RV is allowed to easily recognize goods of which detailed information is present, so that detailed information corresponding to selected goods can be provided to the user in an easy and quick fashion. In addition, because goods identifying information broadcasted corresponding to goods selected by a user serves as pieces of the identification information, the user is able to detailed information about desired goods.

Further, the advertising company module AD is set such that it transmits to the user module RV detailed information in relation to goods selected at the user module RV. Thus, a user is able to obtain, easily and quickly, detailed information about goods viewed on the image.

Furthermore, the data structure of the foregoing identification information is composed of identification information, highlight information, date and time information, and positional information about goods, and section information added to immediately before and after each of those pieces of information. Therefore, each of those pieces of information is sectioned distinctively when being broadcasted. This avoids each piece of information composing the identification information from being mixed, providing a steady broadcast, during which broadcast the user module RV uses those pieces of information to perform, for example, a highlighted display.

It is also possible that the information servicing system increases the chances for advertising and popularizing goods. A good business chance involving the service of goods is provided as well.

In addition, the information servicing system is configured such that an advertising fee to be paid is transmitted to the broadcasting station module TV in advance. It is therefore possible that a broadcasting station having the broadcasting station module TV previously knows the advertising fee that will be paid.

In the information servicing system, the advertising fee is calculated for each piece of the detailed information (for every piece of goods) on the basis of the number of times of providing the detailed information about goods. This calculation becomes fair to every company and accurate.

Moreover, the advertising fee is figured up by adding to a basic fee an amount obtained based on both of the number of times of providing detailed information and a predetermined rate. This results in that the advertising fee is obtained accurately and properly.

Because the advertising fee is paid for the broadcast of identification information included in the broadcast signal $S_{tv}$, the payment and acceptance of the advertising fee can be done properly.

By way of example, in the first embodiment, the existence of goods having its detailed information is highlighted by the frame LN based on the highlight information, but how to notify goods is not restricted to such a way. A window containing a row of characters indicating the existence of detailed information may displayed in real time on the display 31 or on a display apparatus other than the display 31.

As a further preferred modification, when goods of which detailed information is present is displayed, the image of a program can be temporarily halted to produce a static image, instead of dynamic images that have been displayed so far.

Further, on the display 31, an original image maybe reduced and displayed, while whether or not the detailed information about selected goods is present may be serviced in the remaining space.

Second Embodiment

Referring to FIGS. 8 to 14, a second embodiment of the present invention will now be described.

Figure 8:
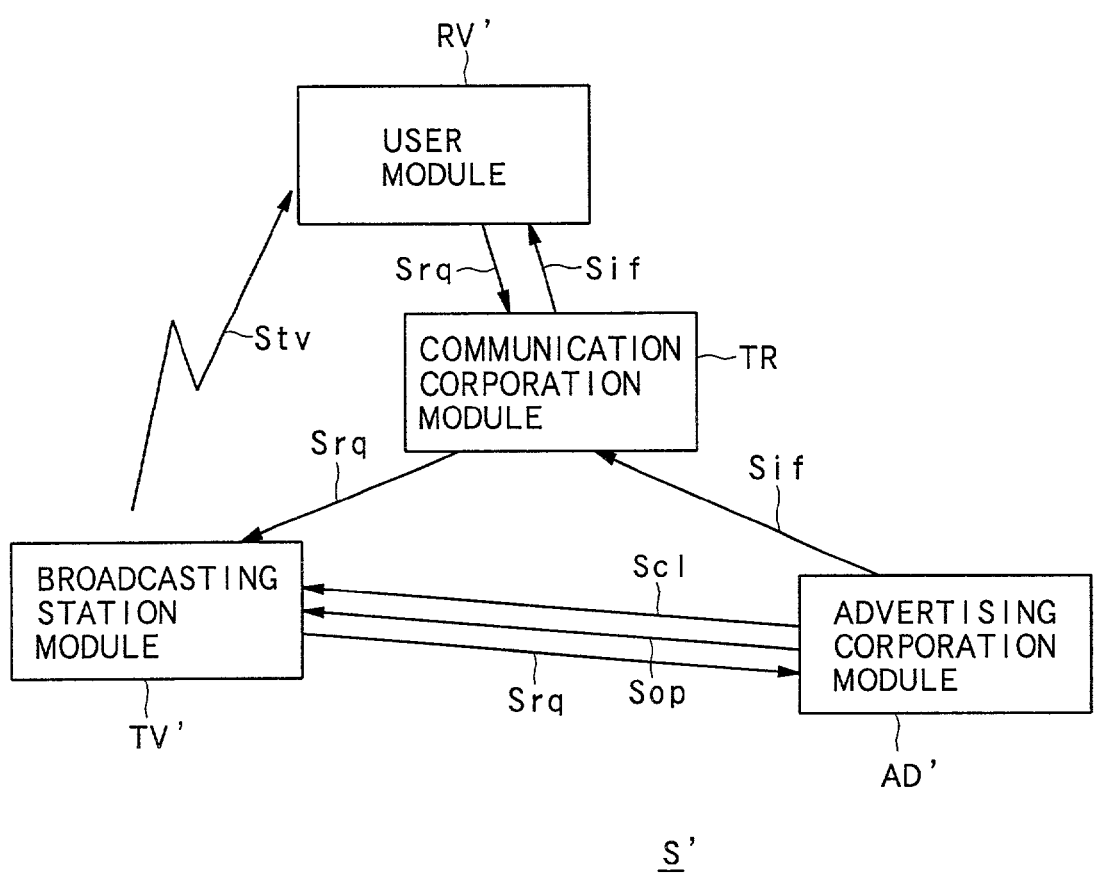
FIG. 8 is a block diagram outlining the structure of an information serving system according to a second embodiment of the present invention.
Figure 9:
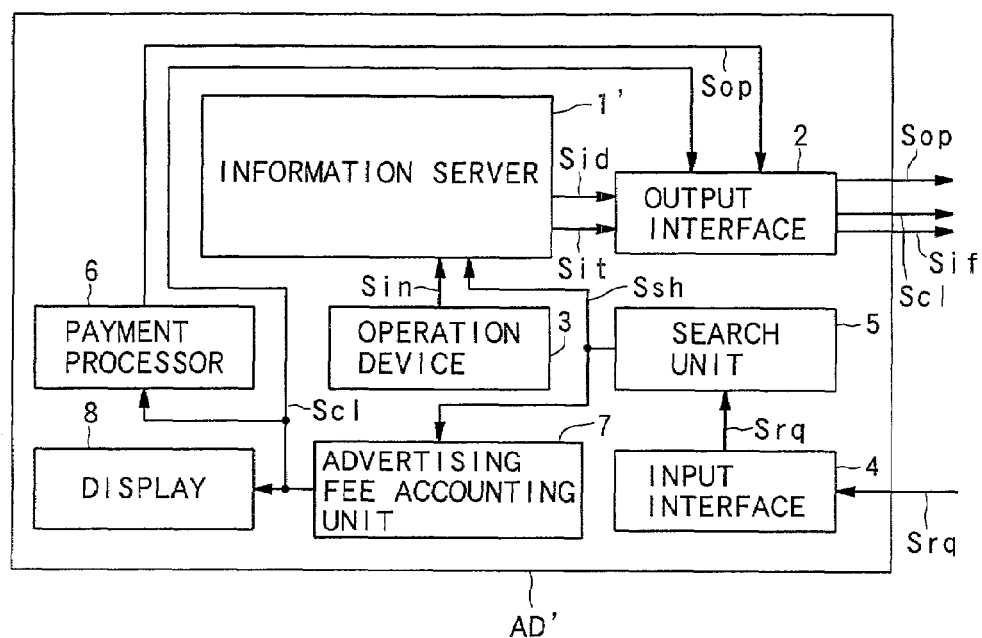
FIG. 9 is a block diagram showing a detailed structure of an advertising companies module in detail in the second embodiment.
Figure 10:
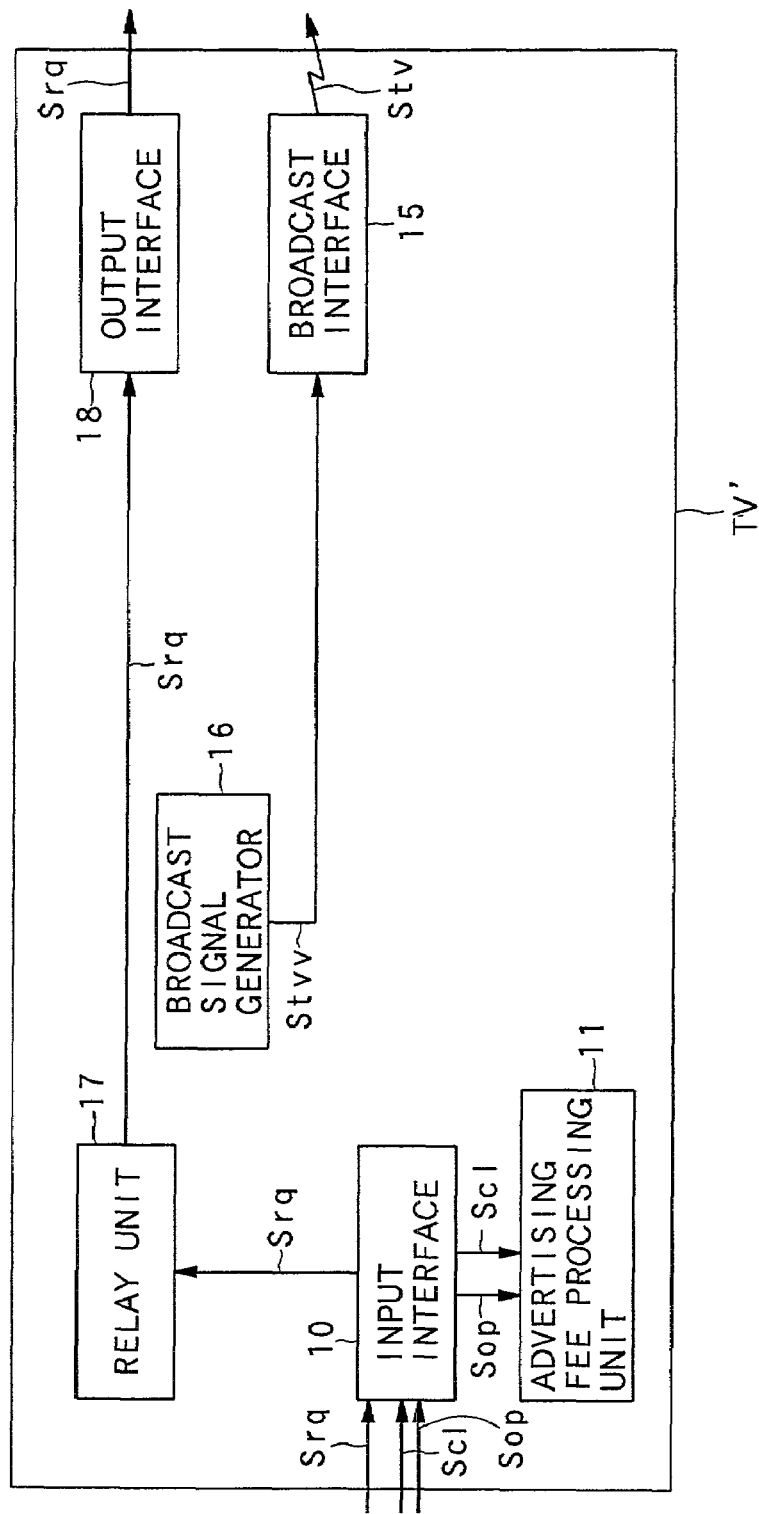
FIG. 10 is a block diagram showing a detailed structure of a broadcasting station module in the second embodiment.
Figure 11:
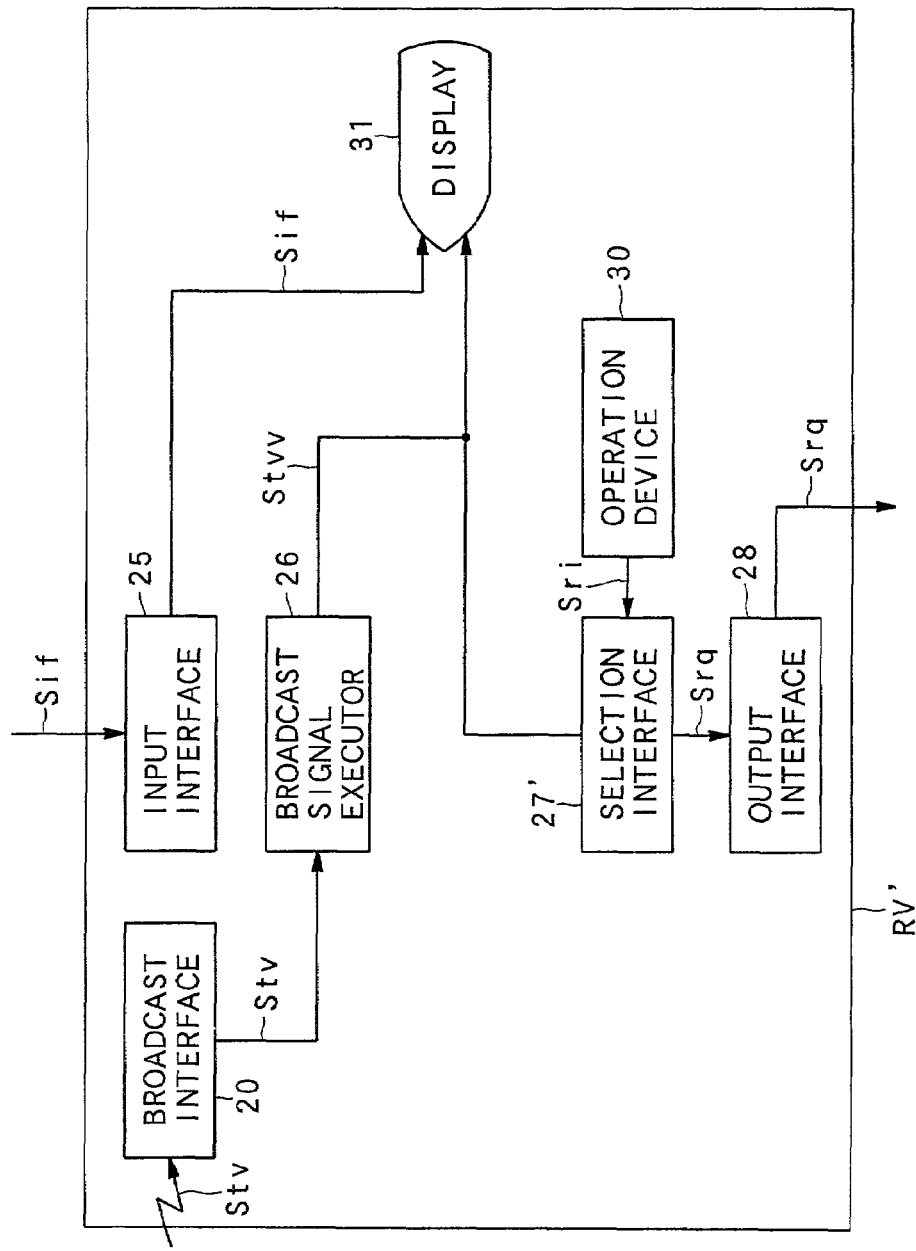
FIG. 11 is a block diagram showing a detailed structure of a receiving side module in the second embodiment.
Figure 12:
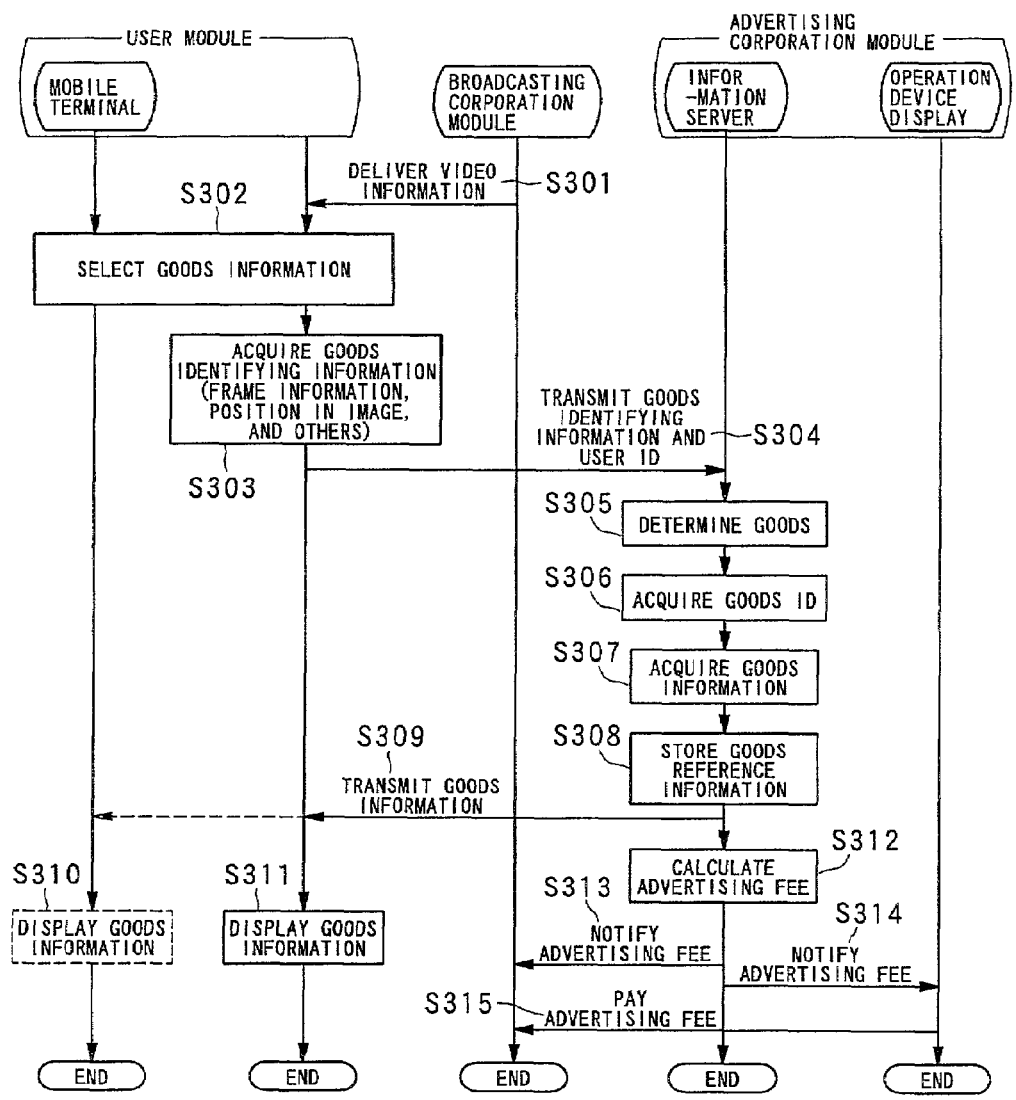
FIG. 12 is a flowchart showing an information serving action in the second embodiment.
Figure 13:
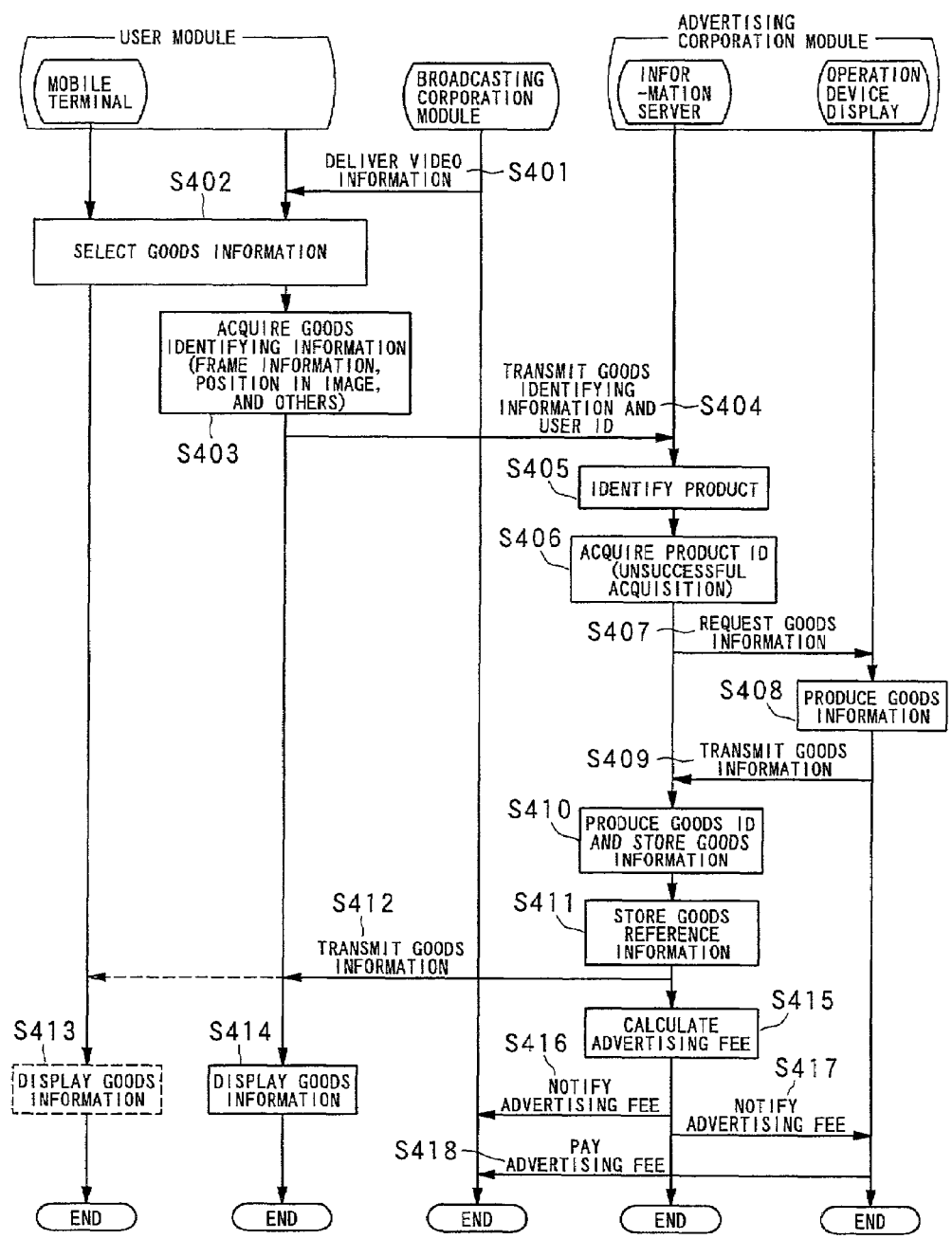
FIG. 13 is a flowchart showing an information serving action in a first special form in the second embodiment.
Figure 14:
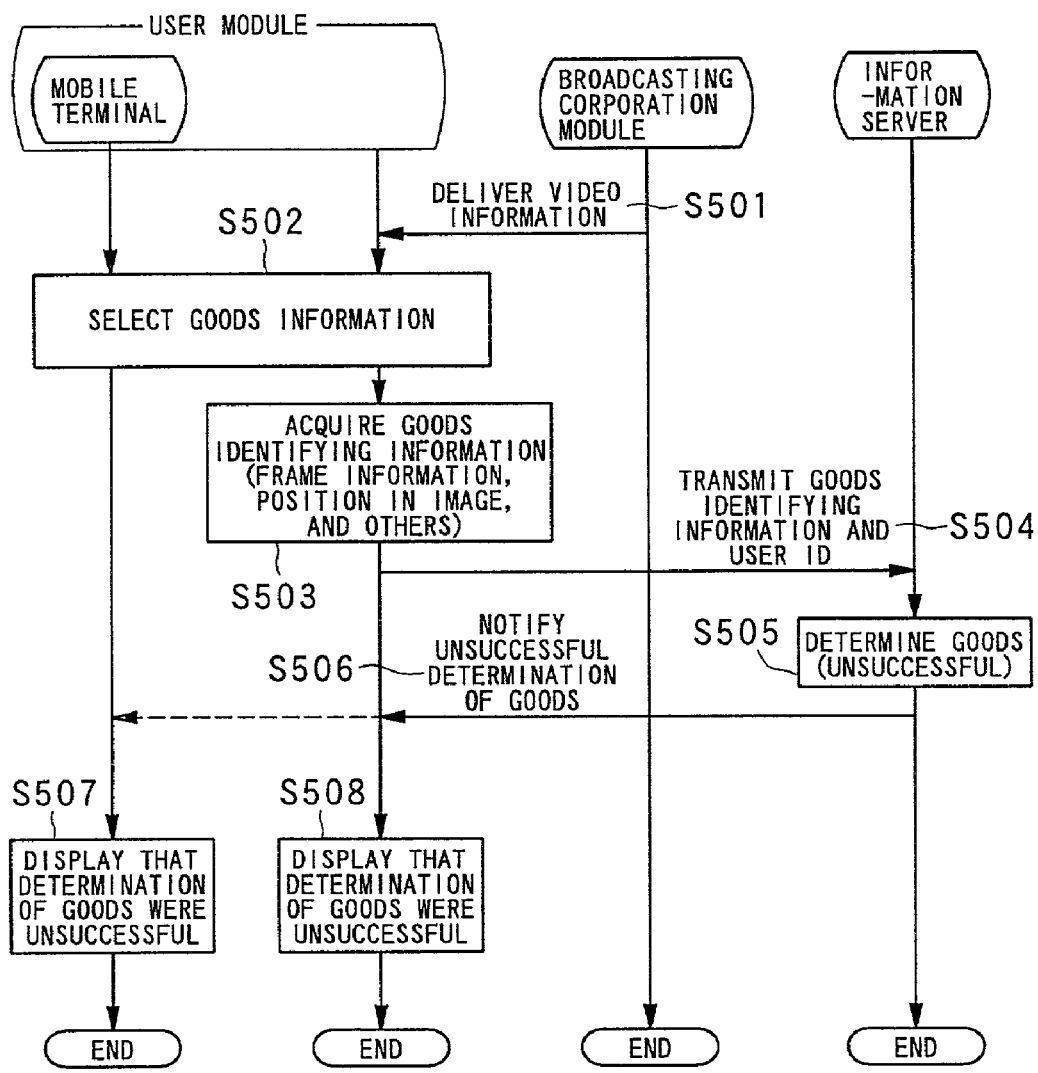
FIG. 14 is a flowchart showing services in a second special form in the second embodiment.

FIG. 8 shows a block diagram that represents the entire configuration of an information servicing system according to the second embodiment. FIGS. 9 to 11 show in detail the configuration of each module included in the information servicing system, while FIGS. 12 to 14 illustrate flows of information servicing processing carried out by the information servicing system.

First, referring to FIG. 8, the entire configuration and operation of the information servicing system will now be described.

As shown in FIG. 8, the information servicing system S' is provided with an advertising company module AD' placed in an advertising company, a broadcasting station module TV' placed in a broadcasting station, a communication company module TR, and a user module RV'. The communication company module TR is placed in a communication company, like the first embodiment, and the user module RV' is placed in the home of a user who receives broadcast signal.

The information servicing system S' adopts a different servicing way from that in the first embodiment. That is, a user is able to view a program at the user module RV' by receiving a signal broadcasted from the broadcasting station module TV'. Detailed information about goods composing a certain image appearing in the program is serviced from the advertising company module AD' that handles the goods to the user who uses the user module RV'.

To attain this operation, the broadcasting station module TV' produces a broadcast signal $S_{tv}$ including images, like the first embodiment, and sends out this signal $S_{tv}$ as a broadcast signal. The broadcast signal $S_{tv}$ will reach the user module RV'.

The user module RV' receives the broadcast signal $S_{tv}$, and displays images based on the signal $S_{tv}$, on a display (Subsequently described), concurrently with the output of audio based on the signal $S_{tv}$ through speakers or others. Thus a user is able to view a program.

At the user module RV', in cases goods included in an image that appeared in a certain viewed program are desired by the user, processing to select the goods in the image is executed as described later.

After such selection was made, an information request signal $S_{rq}$ that includes goods specifying information indicative of the selected goods is outputted from the user module RV' to the communication company module TR via a wired telephone line or cellular telephone line.

The communication company module TR forwards the received information request signal $S_{rq}$, as it is, to the broadcasting station module TV' via the wired or cellular telephone connection. The broadcasting station module TV' relays the received information request signal $S_{rq}$ to the advertising company module AD'.

Responsively, the advertising company module AD' produces a detailed information signal $S_{if}$ that includes detailed information about the goods indicated by the goods specifying information included in the information request signal $S_{rq}$. The module AD' sends out the produced the signal $S_{if}$ to the communication company module TR via the wired or cellular telephone line.

The communication company module TR, when receiving the detailed information signal $S_{if}$, sends out the signal $S_{if}$ without any processing to the signal $S_{if}$ to the user module RV' via the wired or cellular telephone connection.

When receiving the detailed information signal $S_{if}$, the user module RV' represents detailed information included in the detailed information signal $S_{if}$ on the display later described. This representation allows the user to obtain the detailed information in relation to the desired goods that appeared in the program.

Referring to FIGS. 9 to 14, the detailed configuration and operation of each module incorporated in the information servicing system S' will now be described.

First, referring to FIGS. 9 to 11, the detailed configuration of each module will now be described.

The advertising company module AD' is shown in FIG. 9. As shown therein, this module AD' is provided with an information server 1' in which goods information and others are stored, like the information server 1 in the first embodiment. In addition, the module AD' is provided with an output interface 2, operation device 3, input interface 4, search unit 5, payment processor 6, advertising fee calculator 7, and display 8, all of which are formed in the same way as those of the advertising module AD in the first embodiment.

The broadcasting station module TV' is depicted in FIG. 10, in which an input interface 10, advertising fee processor 11, broadcast interface 15, broadcast signal producer 16, relay unit 17, and output interface 18 are provided. All those constituents are formed in the same manner as those of the broadcasting station server TV in the first embodiment.

Moreover, the receiver module RV' is represented in FIG. 11. This module RV' comprises a selection interface 27'. In addition, the module RV' includes a broadcast interface 20, input interface 25, broadcast signal decoder 26, output interface 28, operation device 30, and display 31 each of which is configured in the same manner as that of the user module RV in the first embodiment.

The communication company module TR is configured based on the conventional manner, like that in the first embodiment. The detailed explanation of this module TR is therefore omitted.

Referring mainly to FIGS. 12 to 14, the operation of each module according to the second embodiment will now be detailed.

To make the explanation easier to understand, in FIGS. 12 to 14, the processing at the operation device 3 and display 8 and the processing at the information server 1', both included in the advertising company module AD', will be explained separately. Like the first embodiment, it is assumed that the communication between the user module RV' and communication company module TR be executed via a wired or wireless telephone connection.

First of all, mainly referring to FIG. 12, a basic information-servicing operation according to the second embodiment will now be described.

In the basic information-servicing operation, as shown in FIG. 10, the broadcast signal producer 16 of the broadcasting station module TV' produces a broadcast source signal $S_{tvv}$ that includes images necessary to broadcast a program, and sends the signal $S_{tvv}$ to the broadcast interface 15.

The signal $S_{tvv}$ is subjected to predetermined output interface processing by the broadcast interface 15, then sent to the user module RV' as a broadcast signal $S_{tv}$ (FIG. 12, step S301), which corresponds to the conventional broadcast signal.

The user module RV' receives the broadcast signal $S_{tv}$ which was produced as the conventional broadcast signal. In the user module RV', as shown in FIG. 11, the broadcast signal $S_{tv}$ is inputted into the broadcast interface 20 to undergo predetermined input interface processing, the resultant signal being sent to the broadcast signal decoder 26.

The decoder 26 decodes the broadcast signal $S_{tv}$ to create the original broadcast source signal $S_{tvv}$, which is then provided to both the display 31 and the selection interface 27'.

The display 31 uses the received broadcast source signal $S_{tvv}$ to display a dynamic image or static image of a certain program in a general display mode used conventionally.

If a user who watches the image represented by the display 31 is interested in goods appearing on the image, the user take action to select the desired goods at the operation device 30 at timing when the desired goods are in display (step S302).

This selection is detailed as follows. One example is such that the position of a cursor displayed on the display 31, which is movable by the user, is always monitored by the selection interface 27' which also accepts the broadcast source signal $S_{tvv}$. When goods are selected on the image (for example, the selection can be made with a click of a mouse controlling movement of the cursor), the selection is reflected in an operation signal $S_{ri}$ outputted by the operation device 30. Thus, based on the operation signal $S_{ri}$, the selection interface 27' is able to recognize such selection and the goods pointed by the cursor position. Alternatively, a laser pointer can be used as a pointing technique for such selection. Still, other existing pointing techniques, such as use of frames, may also be used. In the case of using the laser pointer, as the lighting source, a mobile terminal that has the capability of lighting the laser pointer may be adopted (refer to the user module in FIG. 12).

In response to the recognition of desired goods selected, the selection interface 27' produces goods specifying information that specifies the selected goods (step S303). Practically, the goods specifying information includes the frame number (which is referred to as "frame information" in FIG. 12), time information (which is shown as "position in image" in FIG. 12), and channel information. Of these pieces of information, the frame number (frame information) shows a frame in which an image indicative of the goods is included. The time information shows a period of time measured from the time at which the horizontal scanning through the positions representing an image of the goods is started, the goods being present in the frame indicated by the frame number. The channel information shows a channel to specify a broadcasting station that broadcasts the program. In the selection interface 27', individual identifying information to identify the user who has the user module RV' is added to the goods specifying information to produce the foregoing information request signal $S_{rg}$, which is then sent to the output interface 28. The individual identifying information is for example the telephone number of a user's house and referred as "user ID" in FIG. 12.

The output interface 28 performs predetermined output interface processing on the information request signal $S_{rg}$, before transmitting the processed signal to the communication company module TR via the wired telephone line (step S304).

The transmission of the information request signal $S_{rg}$ can be modified into another way. Practically, the goods specifying information obtained by the selection interface, as in FIG. 12, is transmitted to a mobile terminal on the basis of a short-distance wireless communication technique, like the first embodiment. And the goods specifying information is transmitted from the mobile terminal to the communication company module TR based on the wireless technique.

The communication company module TR receives the incoming information request signal $S_{rq}$, and sends it to the broadcasting station module TV' through the wired or wireless telephone connection (step 304).

Responsively to the transmission, in the broadcasting station module TV', as shown in FIG. 10, the input interface 10 receives the information request signal $S_{rq}$, and sends it the relay unit 17. The relay unit 17 performs predetermined processing on the signal $S_{rq}$ to provide the resultant signal to the output interface 18. Therefore, the output interface 18 gives predetermined processing to the information request signal $S_{rq}$, then sends the resultant signal to the advertising company module AD' via, for example, the wired telephone line (step S304).

In the advertising company module AD', as shown in FIG. 9, the input interface 4 operates to give predetermined processing to the information request signal $S_{rq}$, and sends the resultant signal to the search unit 5.

The search unit 5 extracts the goods specifying information included in the information request signal $S_{rq}$, and supplies the extracted goods specifying information to both the information server 1', as a search signal $S_{sh}$ to search the information server 1', and the advertising fee calculator 7.

The information server 1' specifies goods corresponding to the goods specifying information (step S305), extracts goods identifying information indicating the specified goods (step S306), and uses the goods identifying information to search the information server 1'and to acquire necessary detailed information from the information server 1' (step S307). Further, the information server 1' acquires goods reference information concerning the goods, which should be referred with the detailed information and others, and temporarily stores the acquired information therein (step S308). Then, a detailed information signal $S_{if}$ including the detailed information is produced in the information server 1' and sent to the output interface 2.

In reply to this sending, the output interface 2 gives predetermined output interface processing to the detailed information signal $S_{if}$, and sends its processed signal to the communication company module via the wired or wireless telephone connection (step S309).

The communication company module TR accepts the incoming detailed information signal $S_{if}$, then transmitting it to the user module RV' through the wired and wireless telephone connection (step S309).

As shown in FIG. 11, the input interface 25 of the user module RV' that has received the detailed information signal $S_{if}$ has it displayed on the display 31 (FIG. 12, step S311). Therefore, the user who watches this display 31 is able to acquire both the detailed information in relation to the goods previously selected on the program and reference signal relating to the goods.

One additional modification can be established such that the detailed information signal $S_{if}$ that has come to the user module RV' may be transferred to the mobile terminal based on the short-distance wireless communication technique, so that such information may be displayed on the terminal (step S310).

On the other hand, in the advertising company module AD', the advertising fee calculator 7 uses the search signal $S_{sh}$ to calculates an advertising fee that corresponds to the detailed information supplied in the similar manner to that in the first embodiment. The calculator 7 provides the display 8 with the fee in the form of a calculation signal $S_{cl}$ so that the amount of the fee is displayed and notified (step S314). The calculation signal $S_{cl}$ is also provided to both of the output interface 2 and the payment processor 6.

The output interface 2 performs predetermined processing on the calculation signal $S_{cl}$, then sends it to the broadcasting station module TV' via the wired telephone line, for example (step S313).

In the broadcasting station module TV', its input interface 10 gives predetermined input interface processing to the received calculation signal $S_{cl}$, then sends it to the advertising fee processor 11. This processor 11 is able to find the amount of the advertising fee that should be paid by the advertising company for the service of the detailed information, the payer of the fee, and others.

In the advertising company module AD', the payment processor 6 executes the processing to pay the broadcasting station the advertising fee indicated by the calculation signal $S_{cl}$. The processor 6 produces a processing result signal $S_{op}$ that shows a result of the processing, and then sends it to the output interface 2.

Responsively, the output interface 2 performs predetermined output interface processing on the processing result signal $S_{op}$, before transmitting to the broadcasting station module TV' via the wired telephone line, for instance (step S315).

Accordingly, in the broadcasting station module TV', the input interface 10 gives the input interface processing to the processing result signal Sop, and provides it to the advertising fee processor 11. This allows the processor 11 to find that the advertising fee has been paid from the advertising company.

Referring to FIG. 13, a first particular information-servicing operation according to the second embodiment will now be described. This operation is carried out unless the goods identifying information to identify particular goods from the information server 1' has not been extracted.

The configuration of each module that is in charge of the foregoing information-servicing operation is similar to that shown respectively by FIGS. 9 to 11, so their detailed explanations are omitted.

As shown in FIG. 13, in the first particular information-servicing operation, various types of processing are carried out which correspond to the steps S301 to S304 shown in FIG. 12. In other words, carried out in turn are basic transmission processing of a broadcast signal $S_{tv}$ to the user module RV' (step S401), selection processing of goods with an image at the user module RV' (step S402), acquisition processing of good specifying information and user identifying information (step S403), and transmission processing of an information request signal $S_{rq}$, including both of the goods specifying information and the user identifying information, to the advertising company module AD' (step S404).

In the advertising company module AD', the input interface 4 which has received the information request signal $S_{rq}$ makes the signal $S_{rq}$ undergo predetermined input interface processing, as shown in FIG. 9, and sends the processed signal to the search unit 5.

The search unit 5 extracts the goods specifying information included in the information request signal $S_{rq}$, and supplies the extracted goods specifying information to both the information server 1', as a search signal $S_{sh}$ to the information server 1' to be searched, and the advertising fee calculator 7.

The information server 1' uses the goods specifying information to specify goods corresponding to the information (step S405), then tries to extract goods identifying information indicating the specified goods (step S406).

Various reasons including the fact that goods specifying information corresponding to the selected goods or detailed information about the selected goods has not been stored yet in the information server 1' may lead to an unsuccessful extraction of goods identifying information representing the goods. If this unsuccessful extraction happens (step S406), the information server 1' makes the display 8 depict thereon a massage that notifies the unsuccessful extraction and urges an operator to newly input and store necessary detailed information (step S407).

In reply to this display, when the detailed information and others are newly inputted through the operation device (step S408), and the inputted detailed information and others are loaded into the information server 1' (step S409). Further, in the information server 1', goods identifying information indicative of goods specified by the recorded detailed information is created and stored (step S410). Still further, goods reference information which should be referred together with the detailed information and others and which relates to the goods is stored in the information server 1' (step S411). And a detailed information signal $S_{if}$ including the detailed information and others is produced, and sent to the output interface 2.

In reply to sending the detailed information signal $S_{if}$, the output interface 2 gives predetermined output interface processing to the detailed information signal $S_{if}$ and sends it to the communication company module TR via the wired or wireless telephone connection (step S412).

The communication company module TR accepts the incoming detailed information signal $S_{if}$, before transmitting it to the user module RV' through the wired and wireless telephone connection (step S412).

As shown in FIG. 11, the input interface 25 of the user module RV' that has received the detailed information signal $S_{if}$ has it displayed on the display 31 (FIG. 12, step S414). Therefore, the user who watches this display 31 is able to acquire both of the detailed information in relation to the goods previously selected in the program and the reference signal relating to the goods.

One additional modification can be established such that the detailed information signal $S_{if}$ that has come to the user module RV' may be transferred to the mobile terminal based on the short-distance wireless communication technique, on which such information may be displayed (step S413).

After this, like the steps of S312 to S315 shown in FIG. 12, processing for calculating an advertising fee (step S415), display processing of a calculated result on the display 8 (step S417), processing for notification to the broadcasting station module TV' (step S416), and processing for payment of the advertising fee (step S418) are carried out in turn.

Referring to FIG. 14, a second particular information-servicing operation according to the second embodiment will now be described. This operation is carried out, unless the goods itself have not been specified in the information server 1'.

The configuration of each module that is in charge of the foregoing information-servicing operation is similar to that shown respectively by FIGS. 9 to 11, so their detailed explanations are omitted.

As shown in FIG. 14, in the second particular information-servicing operation, various types of processing are carried out which correspond to the steps S301 to S304 shown in FIG. 12. In other words, carried out in turn are basic transmission processing of a broadcast signal $S_{tv}$ to the user module RV' (step S501), selection processing of goods with an image at the user module RV' (step S502), acquisition processing of good specifying information and user identifying information (step S503), and transmission processing of an information request signal $S_{rq}$, including both of the goods specifying information and the user identifying information, to the advertising company module AD' (step S504).

In the advertising company module AD', the input interface 4 which has received the information request signal $S_{rq}$ makes the signal $S_{rq}$ experience predetermined input interface processing, as shown in FIG. 9, and sends the processed signal to the search unit 5.

The search unit 5 extracts the goods specifying information included in the information request signal $S_{rq}$, and supplies the extracted goods specifying information to both the information server 1', as a search signal $S_{sh}$ to the information server 1' to be searched, and the advertising fee calculator 7.

The information server 1' tries to specify desired goods from the goods specifying information (step S505).

Various reasons including the fact that goods specifying information itself corresponding to the selected goods has not been stored yet in the information server 1' may lead to an unsuccessful determination of the goods themselves. If this unsuccessful specification happens (step S405), the information server 1' makes a detailed information signal $S_{if}$ showing that the goods have not been specified, then sends it to the output interface 2.

In reply to this sending, the output interface 2 gives predetermined output interface processing to the detailed information signal $S_{if}$, then sends it to the communication company module TR via the wired or wireless telephone line (step S506).

The communication company module TR accepts the incoming detailed information signal $S_{if}$, before transmitting it to the user module RV' through the wired and wireless telephone connection (step S506).

As shown in FIG. 11, the input interface 25 of the user module RV' that has received the detailed information signal $S_{if}$ has it displayed on the display 31 (FIG. 14, step S508). Therefore, the user who watches this display 31 is able to know that both of the detailed information in relation to the goods previously selected in the program and the reference signal relating to the goods cannot be acquired.

One additional modification can be established such that the detailed information signal $S_{if}$ that has come to the user module RV' may be transferred to the mobile terminal based on the short-distance wireless communication technique, on which such information may be displayed (step S507).

This second particular operation explains the situation that the service of the detailed information and others (that is, the advertising operation) has not been realized. Thus, although the search signal $S_{sh}$ is sent to the advertising fee calculator 7 in FIG. 9, wherein, however, the advertising fee will not be calculated, notified, and paid. Practically, the steps S312 to S315 are skipped in the processing of FIG. 12.

As described above, the information servicing system S' of the second embodiment has the capability of providing the similar advantages to those in the first embodiment, even when the accompanying data $S_{mt}$ are absent. Particularly, instead of the goods specifying information, the information request signal $S_{rq}$ including the frame number and time information can be used to have, without fail, the operations and advantages identical to those that in the first embodiment.

Though the above embodiments been described about the configuration in which the information server is arranged in the advertising company module, the present invention is not limited to such a configuration. For example, the information server can be placed within the broadcasting station module. In this configuration, detailed information about goods, which is produced by the advertising company module, is transmitted to the broadcasting module to store the detailed information in the information server, which is capable of transmitting the foregoing detailed information signal $S_{if}$ to the user module.

Further, in the above embodiments, the configuration of making the user module transmit the information request signal $S_{rq}$ to the advertising company module via the broadcasting station module can be changed. One alternative is that the information request signal $S_{rq}$ is transmitted directly to the advertising company module. In this configuration, it is avoidable that the information request signal $S_{rq}$ overconcentrates at the broadcasting station module, the information request signal $S_{rq}$ smoothly arriving at the advertising company module.

Still further, it is also possible that the information request signal $S_{rq}$ is transmitted through the Internet. If such a configuration is provided, the user is able to access to other information service sites to obtain, to some extent, information about desired goods, whatever it might be impossible to obtain the detailed information as detailed as that in the above embodiments.

Furthermore, the information servicing system according to the above embodiments can be applied to for example the purchase or reservation of tickets, or the acquisition of various kinds of information, such as hotels, dishes, tours, parties, or meetings, not limited to the service of detailed information about goods.

A further modification is provided, in which the programs shown by the flowcharts in FIGS. 5, 6A, 6B, and 12-14 are stored in such an information-recording medium as a flexible disk or hard disk so that a universal microcomputer can read the programs. Thus, the microcomputer executes the read-out programs serves as control apparatuses to control the user module, advertising company module, and broadcasting station module, respectively.

Further, the user module is able to additionally have a picture recording function, under which the signal of a program recorded by using the picture recording function can be used to select desired goods.

Still, each of the above embodiments provide the system in which one user module, one advertising company module, and one broadcasting station module are included, but at least one of the modules can be composed of a plurality of modules.

The present invention is not confined to the configurations listed in the foregoing embodiments, but it is easily understood that the person skilled in the art can modify such configurations into various other modes, within the scope of the present invention described in the claims.

The entire disclosures of Japanese Patent Applications No. 2000-395746 filed on Dec. 26, 2000, No. 2000-395747 filed on Dec. 26, 2000 and No. 2000-395748 filed on Dec. 26, 2000 including the specification, claims, drawings and summary are incorporated herein by reference in its entirety.

What is claimed is:

1. An information serving system comprising:
a broadcast module having a broadcast unit to broadcast a program including at least video information;
a reception module having:
   a receiver to receive the broadcast program,
   a selector to select at least any one of static and dynamic image components composing an image comprising the video information included in the received broadcast program wherein during selection the broadcast program is temporarily halted to produce a static image instead of a dynamic image,
   a producing unit to produce specification information indicative of the selected image component,
   a transmitter to transmit the produced specification information, and
   a presenting unit to receive incoming component information and present the received component information; and
an information serving module having an acquiring unit to acquire the incoming specification information, and a transmitter to transmit to the reception module the component information indicative of the image component indicated by the acquired specification information.

2. An information serving system comprising:
a broadcast module having a broadcast unit to broadcast a program including at least video information;
a reception module having:
   a receiver to receive the broadcast program,
   a picture recording function to record the broadcast program,
   a selector to select at least any one of static and dynamic image components composing an image comprising the video information included in the broadcast program recorded with the picture recording function,
   a producing unit to produce specification information indicative of the selected image component, and
   a transmitter to transmit the produced specification information, and
   a presenting unit to receive incoming component information and present
the received component information; and
an information serving module having an acquiring unit to acquire the incoming specification information, and a transmitter to transmit to the reception module the component information indicative of the image component indicated by the acquired specification.

3. The information serving system according to claim 1, wherein the broadcast module further comprises a fee processing unit to acquire and process a piece of incoming information about a fee payment for information service, and the information serving module further comprises a fee information transmitter to produce the fee payment information about payment of an information serving fee accompanying the transmitted component information when the transmitter transmits the component information to the reception module and to transmit the produced fee payment information to the broadcast module.

4. The information serving system of claim 1, wherein the producing unit of the reception module is configured to produce, as the specification information, a piece of specification information including at least information about time at which positional information indicative of a position of the image component in the image and the image including the image component are outputted.

5. The information serving system comprising:
a broadcast module having broadcast means for broadcasting a broadcast program including at least video information;
a reception module having:
   reception means for receiving the broadcast program thus broadcasted,
   selection means for selecting at least any one of static and dynamic image components composing an image comprising the video information included in the received broadcast program wherein during selection the broadcast program is temporarily halted to produce a static image instead of a dynamic image,
   production means for producing specification information indicative of the selected image component,
   transmission means for transmitting the produced specification information, and
   presentation means for receiving incoming component information and presenting the received component information; and
an information serving module having
   acquisition means for acquiring the incoming specification information, and transmission means for transmitting to the reception module the component information indicative of the image component indicated by the acquired specification information.

6. The information serving system comprising:
a broadcast module having broadcast means for broadcasting a broadcast program including at least video information;
a reception module having:
   reception means for receiving the broadcast program thus broadcasted,
   a picture recording function to record the broadcast program,
   selection means for selecting at least any one of static and dynamic image components composing an image consisting of the video information included in the broadcast program recorded with the picture recording,
   production means for producing specification information indicative of the selected image component,
   transmission means for transmitting the produced specification information,
   presentation means for receiving incoming component information and presenting the received component information; and
an information serving module having acquisition means for acquiring the incoming specification information, and transmission means for transmitting to the reception module the component information indicative of the image component indicated by the acquired specification information.

7. A reception module included in the information serving system of claim 6, comprising: the reception means; the picture recording function; the selection means; the production means; the transmission means; and the presentation means, wherein the identification information includes component identifying information for identifying the image component, highlight information for highlight-displaying the image component in displaying the image component by the selection means included in the reception module, date and time information indicative of a date and time on and at which the broadcast information including the image component is broadcasted, and positional information indicative of a display position of the image component in the image composed of the image component, and the selection means includes highlight display means for highlight-displaying the image component determined by the identification information, the date and time information, and the positional information.

8. The reception module according to claim 7, wherein the selection means comprises specification means for specifying the image component highlight-displayed, and the production means is configured to produce, as the specification information, the identification information broadcasted correspondingly to the specified image component.

9. The information serving system according to claim 5, wherein the broadcast module further comprises fee processing means for acquiring and processing a piece of incoming information about a fee payment for information service, and the information serving module further comprises fee information transmitting means for producing the fee payment information about payment of an information serving fee accompanying the transmitted component information when the transmission means transmits the component information to the reception module and for transmitting the produced fee payment information to the broadcast module.

10. The information serving system according to claim 9, wherein the broadcast module further comprises fee information acquiring means for acquiring a piece of incoming information about a fee for information serving transmitted from the information serving module, and the information serving module further comprises further fee information transmitting means for transmitting to the broadcast module the fee information indicative of the information serving fee prior to transmitting the fee payment information, when the component information is transmitted to the reception module.

11. The information serving system according to claim 9, wherein the information serving fee is calculated in the information serving module for every piece of component information on the basis of the number of times of supplying the component information.

12. The information serving system according to claim 11, wherein the information serving fee is calculated in the information serving module for every piece of component information through addition of a predetermined basic fee to an amount obtained by multiplying a predetermined scale by the number of times.

13. The information serving system according to claim 9, wherein the broadcast means included in the broadcast module is configured to include a piece of identification information to identify the image component into the broadcast information so as to broadcast the broadcast information including the identification information, the selection means in the reception module is configured to select the image component using the broadcasted identification information, and the information serving fee is a fee which should be paid for broadcasting the broadcast information including the identification information.

14. The information serving system according to claim 5, wherein the production means of the reception module is configured to produce, as the specification information, a piece of specification information including at least information about time at which positional information indicative of a position of the image component in the image and the image including the image component are outputted.

15. An information serving system comprising:
a broadcast module having a broadcast unit to broadcast a program including at least video information;
a reception module having:
  a receiver to receive the broadcast program,
  a selector to select at least any one of static and dynamic image components composing an image comprising the video information included in the received broadcast program wherein the selector is responsive to a user-manipulated input device for generating a product information request signal in response thereto,
  a producing unit to produce specification information indicative of the selected image component wherein the producing unit is responsive to the product information request signal to produce said specification information indicative of the selected image component,
  a transmitter to transmit the produced specification information, and
  a presenting unit to receive incoming component information and present the received component information; and
an information serving module having an acquiring unit to acquire the incoming specification information, and a transmitter to transmit to the reception module the component information indicative of the image component indicated by the acquired specification information.

* * * * *